US012675439B2

(12) United States Patent
Calveley

(10) Patent No.: US 12,675,439 B2
(45) **Date of Patent: *Jul. 7, 2026**

(54) MEDIA PRODUCTION SYSTEM AND METHOD FOR ASSOCIATING MEDIA FILE VERSIONS

(71) Applicant: Autodesk, Inc., San Francisco, CA (US)

(72) Inventor: Hugh Stephen Calveley, Mount Albert Auckland (NZ)

(73) Assignee: AUTODESK, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/984,675

(22) Filed: Dec. 17, 2024

(65) Prior Publication Data

US 2025/0124003 A1 Apr. 17, 2025

Related U.S. Application Data

(63) Continuation of application No. 17/285,692, filed as application No. PCT/NZ2018/050143 on Oct. 17, 2018, now Pat. No. 12,169,473.

(51) Int. Cl.

| | |
|---|---|
| ***G06F 16/16*** | (2019.01) |
| ***G06F 16/18*** | (2019.01) |
| ***G06F 16/71*** | (2019.01) |
| ***G06F 16/78*** | (2019.01) |
| ***G06F 16/783*** | (2019.01) |
| ***G11B 27/34*** | (2006.01) |

(52) U.S. Cl.
CPC ........ *G06F 16/164* (2019.01); *G06F 16/1873* (2019.01); *G06F 16/71* (2019.01); *G06F 16/783* (2019.01); *G06F 16/7867* (2019.01); *G11B 27/34* (2013.01)

(58) Field of Classification Search
CPC .. G06F 16/164; G06F 16/783; G06F 16/1873; G06F 16/71; G06F 16/7867; G11B 27/34
See application file for complete search history.

(56) References Cited

U.S. PATENT DOCUMENTS

| | | | |
|---|---|---|---|
| 5,960,081 | A | 9/1999 | Vynne et al. |
| 6,026,413 | A | 2/2000 | Challenger et al. |
| 6,389,421 | B1 | 5/2002 | Hawkins et al. |
| 7,337,321 | B2 | 2/2008 | Terada et al. |
| 7,555,557 | B2 | 6/2009 | Bradley et al. |
| 7,660,416 | B1 | 2/2010 | Kline |

(Continued)

FOREIGN PATENT DOCUMENTS

| | | |
|---|---|---|
| WO | 2009131861 | 10/2009 |
| WO | 2018083152 | 5/2018 |

OTHER PUBLICATIONS

PCT International Search Report & Written Opinion dated Feb. 12, 2019 for PCT Application No. PCT/NZ2018/050143, 18 pp.

(Continued)

*Primary Examiner* — Marc S Somers
(74) *Attorney, Agent, or Firm* — Gates & Cooper LLP

(57) ABSTRACT

A method of modifying metadata associated with a media file is described the method comprising receiving a first media file; receiving a first metadata associated with the first media file; receiving an identifier of a second media file; and modifying the first metadata to include the identifier of the second media file.

18 Claims, 8 Drawing Sheets

(56) References Cited

U.S. PATENT DOCUMENTS

| | | | |
|---|---|---|---|
| 8,155,463 | B2 | 4/2012 | Wong et al. |
| 8,218,764 | B1 | 7/2012 | Kline |
| 9,215,514 | B1 | 12/2015 | Kline |
| 9,418,067 | B1 | 8/2016 | Vice et al. |
| 9,426,502 | B2 | 8/2016 | Perry |
| 2002/0035732 | A1 | 3/2002 | Zetts |
| 2002/0120849 | A1 | 8/2002 | McKinley et al. |
| 2005/0114357 | A1 | 5/2005 | Chengalvarayan et al. |
| 2006/0023082 | A1 | 2/2006 | Higuchi |
| 2007/0147656 | A1 | 6/2007 | Browning |
| 2007/0220220 | A1 | 9/2007 | Ziv et al. |
| 2007/0299888 | A1 | 12/2007 | Thornton et al. |
| 2009/0034933 | A1 | 2/2009 | Rich |
| 2009/0231459 | A1 | 9/2009 | Wayne et al. |
| 2011/0082869 | A1 | 4/2011 | Ogikubo et al. |
| 2011/0085025 | A1 | 4/2011 | Pace et al. |
| 2011/0191320 | A1 | 8/2011 | Glover |
| 2011/0249128 | A1 | 10/2011 | Squyres et al. |
| 2012/0206653 | A1 | 8/2012 | Graves et al. |
| 2012/0210217 | A1 | 8/2012 | Abbas et al. |
| 2012/0308071 | A1 | 12/2012 | Ramsdell et al. |
| 2013/0125000 | A1 | 5/2013 | Fleischhauer et al. |
| 2013/0222610 | A1 | 8/2013 | Brahms et al. |
| 2013/0290557 | A1 | 10/2013 | Baratz |
| 2014/0143068 | A1 | 5/2014 | Simonian et al. |
| 2014/0247392 | A1 | 9/2014 | Mooneyham |
| 2014/0282087 | A1 | 9/2014 | Cioni et al. |
| 2014/0325550 | A1 | 10/2014 | Winograd et al. |
| 2015/0241766 | A1 | 8/2015 | Kehlet et al. |
| 2015/0339603 | A1 | 11/2015 | Walker |
| 2017/0169855 | A1 | 6/2017 | D'Autremont |
| 2017/0180822 | A1 | 6/2017 | Pradel et al. |
| 2017/0200473 | A1 | 7/2017 | Moore et al. |
| 2017/0214944 | A1 | 7/2017 | Arrighetti |
| 2018/0137466 | A1 | 5/2018 | Claman et al. |

OTHER PUBLICATIONS

AAF Association Specification—Advanced Authoring Format (AAF) Edit Protocol, Apr. 8, 2005, pp. 1-52, Copyright © 2004 AAF Association.

"Digital on-screen graphic", https://en.wikipedia.org/wiki/Digital_on-screen_graphic, pp. 1-25, as downloaded Feb. 1, 2023.

Kopilovic, I., et al., Video-DNA: Large-Scale Server-Side Watermarking, 15th European Signal Processing Conference (EUSIPCO 2007), Poznan, Poland, Sep. 3-7, 2007, pp. 2286-2290.

Wolf, J., et al., "Joust Streamlines Digital Workflow for 'COSMOS: A Spacetime Odyssey'", https://www.awn.com/news/joust-streamlines-digital-workflow-cosmos-spacetime-odyssey, Jun. 5, 2014, pp. 1-5.

Debes, E., et al., "Watermarking scheme for large images using parallel processing", Proc. SPIE 4314, Security and Watermarking of Multimedia Contents III, Aug. 2001, pp. 26-34.

Yingliang, H., et al., "A real-time dual watermarking algorithm of H.264/AVC video stream for Video-on-Demand service", Int. J. Electron. Commun. (AEO), 2012, pp. 305-312.

Open Media Framework—OMF Interchange Specification Version 2.1, OMF Developers' Desk Avid Technology, Inc., Sep. 1997, Copyright 1995, 1997 Avid Technology, Inc., pp. 1-282.

Sending Metadata and video data from camera to first computer platform — 17

At first computer platform, transcoding second version video into second version video files — 18

Sending second version video files and metadata from first computer platform to cloud-based media platform — 19

At cloud-based media platform, additional transcoding of second version video files — 20

Transferring second version video files from cloud-based media platform to editing platform — 21

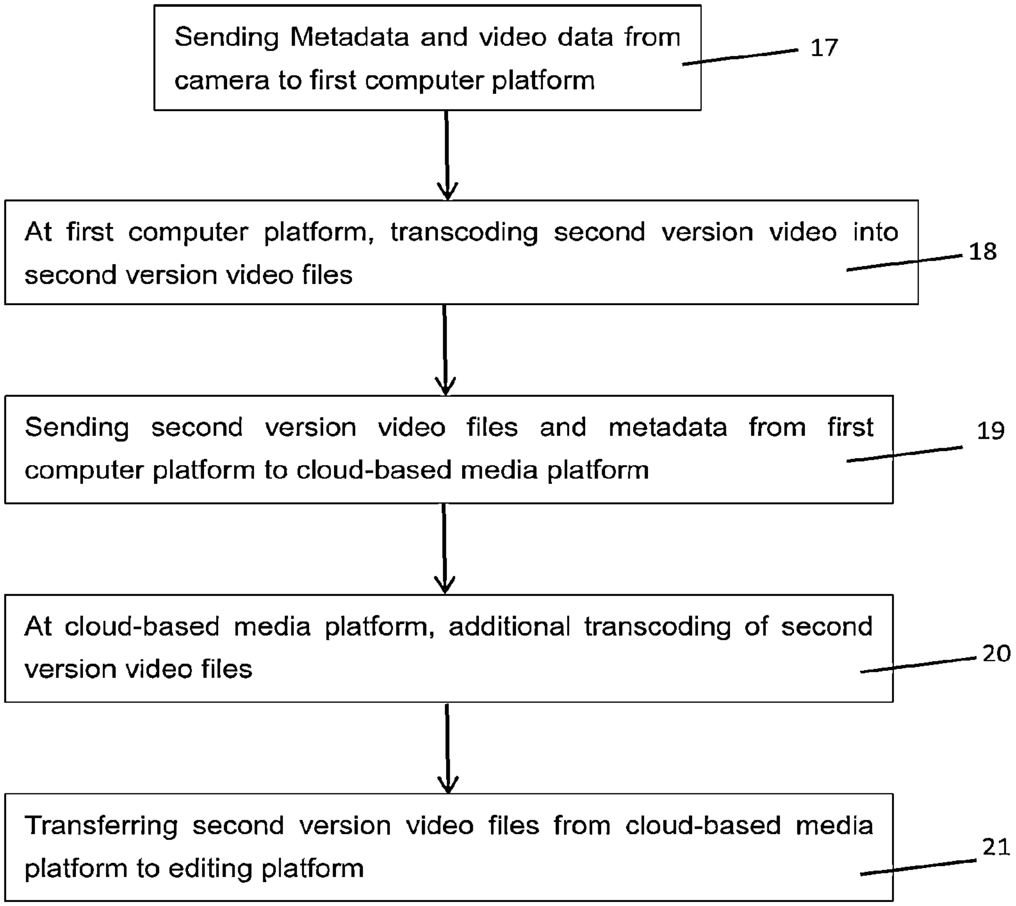

Fig. 3 receiving edited media from editing platform at cloud-based media platform ——24 sending edited media from cloud-based media platform to first computer platform, —— 25 sending edited media from first computer platform, to first media viewing platform ——26 receiving annotations relating to edited media from first media viewing platform at first computer platform, —— 27 receiving annotations relating to edited media from first computer platform, at cloud-based media platform —— 28 sending annotations relating to edited media from cloud-based media platform, to editing platform —— 29

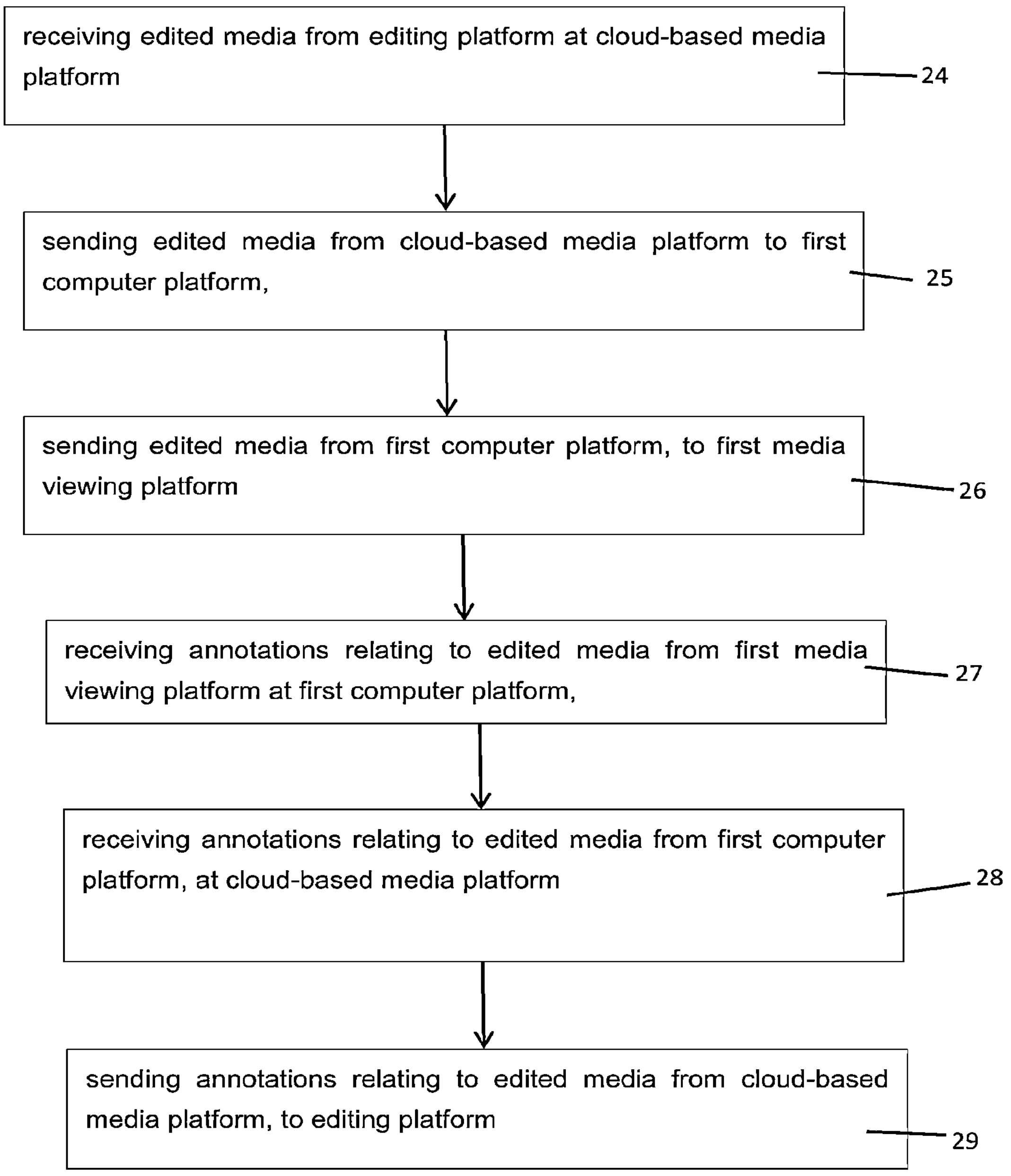

Fig. 5

MEDIA PRODUCTION SYSTEM AND METHOD FOR ASSOCIATING MEDIA FILE VERSIONS

CROSS-REFERENCE TO RELATED APPLICATIONS

This application is a continuation under 35 U.S.C. § 120 of application Ser. No. 17/285,692, filed on Apr. 15, 2021 (now U.S. Pat. No. 12,169,473 issued on Dec. 17, 2024), with inventor(s) Hugh Stephen Calveley, entitled "MEDIA PRODUCTION SYSTEM AND METHOD FOR ASSOCIATING MEDIA FILE VERSIONS," which application is incorporated by reference herein, and which application is a U.S. National Stage patent application filed under 35 U.S.C. 371 of International Patent Application No. PCT/NZ2018/050143, filed Oct. 17, 2018, the entire contents of which are hereby incorporated by reference as fully set forth herein for all purposes.

FIELD

This invention relates to media production, in particular media production workflows.

BACKGROUND

A number of patents, patent application and publications relate to media production workflows. Reference to any document in this specification does not constitute an admission that it is prior art, validly combinable with other documents or that it forms part of the common general knowledge.

Review and approval system U.S. Pat. No. 7,555,557. Publication date: Jun. 30, 2009. 2000. Bradley et al. describes an early dailies system.

US20050114357 A1 Collaborative media indexing system and method. Publication date May 26, 2005 Filing date Nov. 20, 2003 Inventors Rathinavelu Chengalvarayan, Philippe Morin, Robert Boman, Ted Applebaum shows a system which allows tag information to be input from automated sources, such as environmental sensors, global positioning sensors and from other sources of information relevant to the multimedia footage being recorded.

U.S. Pat. Nos. 9,215,514 7,660,416, and 8,218,764 refer to a method for delivering media content in full motion video to users via a network in a collaborative media production process. The solution is aimed at transferring AV content and associated meta-data to a collaborative display interface, where it can be viewed and commented on.

U.S. patent application No. 20150339603 WALKER; Mark Leroy Nov. 26, 2015 "METHOD AND APPARATUS FOR MAPPING PROCESS INFORMATION ONTO ASSET DATA" describes a method and apparatus for modeling a production pipeline.

U.S. patent application No. 20170214944 ARRIGHETTI; Waiter Jul. 27, 2017METHOD AND APPARATUS FOR DELOCALIZED MANAGEMENT OF VIDEO DATA describes a cloud-based storage solution for handling video data, including transcoding.

U.S. patent application No. 20140282087 Cioni; Peter; et al. Sep. 18, 2014 "System and Methods for Facilitating the Development and Management of Creative Assets" describes a system that allows clips to be reviewed and commented upon almost immediately after each take.

U.S. patent application No. 20090034933 Rich; Michael Dillon Feb. 5, 2009 "Method and System for Remote Digital Editing Using Narrow Band Channels" describes editing of low resolution content and applying the editing parameters to high resolution content.

United States patent application "stereographic cinematography metadata recording" Pace et al Apr. 14, 2011 describes a "post roll delay" for receiving and storing media at a recording device.

Joust Streamlines Digital Workflow for 'COSMOS: A Spacetime Odyssey' Digital workflow management tool saves production time and money, affording complete control over digital assets by Jennifer Wolfe | Thursday, Jun. 5, 2014 at 2:07 pm linked from www.awn.com/vfxworld States: One of Joust's most valuable contributions is that it allows creative supervisors full control over the assets during the production. Joust allows for instant reviews of shot submissions through a web based 'dailies viewer' as well as on demand editorial pulls," explained Joust founder, Jenny Fulle. "The process empowers productions to securely transfer and receive data to and from multiple VFX vendors, with the touch of a button."

Eli Dolleman, Co-Producer, Post Production and Animation on *Cosmos: A Spacetime Odyssey* noted, "On COSMOS, we used Joust to streamline a number of areas in our digital pipeline. Joust provided an online viewing platform for all our dailies. It also served as a centralized asset repository for the VFX camera data collected on set, as well as viewing proxies of vendor delivered shots in all stages of production. This allowed producers and executives to both review footage and keep tabs on shot production. In addition to helping organize and view incoming vendor shots, Joust also smoothed out the turnover process, pairing relevant data with raw plates and delivering this material securely to more than a dozen different VFX vendors."

To elaborate on Joust's role in facilitating the turnover process, Eli explained, "Through file association during the dailies ingestion process Joust allowed our editorial staff to pull plates through the submission of simple EDLs. These EDLs would be read by Joust which would work in tandem with a Colorfront Transkoder, referencing camera masters, converting them to full resolution DPX files and posting these files to our various vendors."

U.S. patent application No. 20150241766 Kehlet; Jannik Dam; et al. Aug. 27, 2015 "METHOD AND SYSTEM FOR ORGANISING IMAGE RECORDINGS AND SOUND RECORDINGS" describes a system in which visual information codes and audible information codes are used to synchronise audio and sound tracks.

U.S. patent application No. 20130222610 Brahms; Jason; et al. Aug. 29, 2013 CAPTURING METADATA ON SET USING A SMART PEN describes processes such as processing data timestamps, time alignment—data to file (e.g., aligning notes to video clip), data multiplexing (muxed/timed data into file header), data reformatting—new time aligned data and/or rich media converted into final deliverable package.

U.S. patent application No. 20110249128 Squyres; Phil; et al. Oct. 13, 2011 "CAMERA EVENT LOGGER" describes determining an offset between the timecode value associated with video data and the timecode value associated with sound data at a particular event and transmitting the offset to a post-production ingest station.

U.S. patent application No. 20140247392 Mooneyham; Mark Randall Sep. 4, 2014 "Systems and Methods for Determining, Storing, and Using Metadata for Video Media Content" describes a system where a computer extracts information from the recorded video to be embedded or otherwise associated with the recorded video as metadata.

U.S. patent application No. 20180137466 Claman; Timothy H.; et al. May 17, 2018 METHODS AND SYSTEMS FOR COLLABORATIVE MEDIA CREATION shows another typical media production workflow.

U.S. patent application No. 20170169855D'Autremont; Charles A. Jun. 15, 2017 Method and Apparatus for Low Latency Non-Linear Media Editing Using File-Based Inserts into Finalized Digital Multimedia Files shows a method of rapidly editing essence files.

U.S. patent application No. 20110082869 Ogikubo; Junichi; et al. Apr. 7, 2011 DEVICE AND METHOD FOR PROCESSING INFORMATION shows a method of managing metadata related to transcoded files.

Content-Based Synching

Various solutions have been applied for synchronizing audio and video. See for example, US20150241766, US20170214944, and U.S. Pat. No. 9,418,067.

In U.S. patent application No. 20130125000 "automatic generation of multi-camera media clips" the application can adjust synchronization of the groups by comparing audio data of media clips.

U.S. patent application No. 20090231459 Wayne; Ian; et al. Sep. 17, 2009 CAMERA DIRECT DAILIES does mention the coordination between the higher and lower resolution video data, (at paragraph 25). In particular, at paragraph 30, "The ingest station 110 performs a first level quality control operation to detect incompatible frame rates, timecode standards, missing identifiers, and others. These problems would be logged and available for immediate correction on the set" and "In a parallel recording scheme, discrepancies can exist between the master recording and the proxy version." And "To address this problem, a means of automatically replacing low-resolution (e.g., MXF) files with their high-resolution counterparts is provided for in the shared network environment" "Other data including sound, logging, color correction, metadata, as well as high-resolution master recording are integrated, at box 250, to be sent to the server. A quality control operation is performed, at box 260, to detect incompatible frame rates, timecode standards, missing identifiers, and other discrepancies. These problems would be logged and available for immediate correction on the set."

Visible Watermarking

Visible watermarking as a method of enforcing control of content is commonly used for broadcast television. For example, www.en.wikipedia.org/Digital on-screen graphic States: "Graphics may be used to identify if the correct subscription is being used for a type of venue. For example, showing Sky Sports within a pub requires a more expensive subscription; a channel authorized under this subscription adds a pint glass graphic to the bottom of the screen for inspectors to see. The graphic changes at certain times, making it harder to counterfeit."

An exemplary patent application for burn-in of visible watermarking including user identifying information using parallel processing is: US20170180822 Pradel; Kai Christian; et al. Jun. 22, 2017 "Real-Time Watermarking of Video Content.

Invisible Watermarking

There are a number of references that describe using multiple parallel processors to insert watermarks in content including Debes et al., "Watermarking Scheme for Large Images Using Parallel Processing," Proc. of SPIE vol. 4314 (2001), pp. 26-34.

U.S. Pat. No. 6,389,421Hawkins, et al. May 14, 2002 "Handling processor-intensive operations in a data processing system" Describes parallel thread processing to dynamically watermark multiple images.

U.S. Pat. No. 5,960,081 Vynne, et al. Sep. 28, 1999 "Embedding a digital signature in a video sequence" Describes parallel processing to embed watermarks in a video sequence.

U.S. patent application No. 20070147656 Browning; James Jun. 28, 2007 "METHOD AND SYSTEM TO PROVIDE SUPPORT FOR DIGITAL WATERMARKS IN A DATABASE" Describes a parallel processing system to embed a time in an image watermark. It also describes parallel processing to watermark video.

Video-Dna: Large-Scale Server-Side Watermarking Ivan Kopilovic, Virginie Drugeon, and Marcel Wagner 15th European Signal Processing Conference (EUSIPCO 2007), Poznan, Poland, Sep. 3-7, 2007, pp 2286-2290 describes a method for VOD systems called "VideoDNA". VideoDNA embeds the user or session ID into the video on-the-fly during the streaming session by switching between several watermarked copies of the nsame video file.

A real-time dual watermarking algorithm of H.264/AVC video stream for Video-on-Demand service He Yingliang, Yang Gaobo, Zhu Ningbo Int. J. Electron. Commun. (AEÜ) 66 (2012) 305-312 Uses parallel processing for invisible watermarking.

U.S. Pat. No. 8,155,463 describes a visible marking solution that embeds information in content in segmented video that identifies the recipient.

U.S. Pat. No. 7,337,321 describes a system in which a visible embedded watermark can be selected to be inserted or not.

U.S. Patent Application US2012308071 Methods and Apparatus for Watermarking and Distributing Watermarked Content Ramsdell Scott et al describes watermarking segmented video.

U.S. Patent Application US2014325550 REAL-TIME ANTI-PIRACY FOR BROADCAST STREAMS WINOGRAD JOSEPH M et al describes describes watermarking segmented video and detection of the watermarks.

U.S. Patent Application US2002120849 Parallel processing of digital watermarking operations.

MCKINLEY TYLER J et al describes parallel watermarking of a segmented media signal.

U.S. Pat. No. 9,426,502 Perry Aug. 23, 2016 "Real-time cloud-based video watermarking systems and methods" describes a system that embeds or burns in a watermark "that typically is not immediately apparent to a viewer of the video" using information about a client or viewer such as an identifier. It also describes overlays. The identifier may be added to the overlays. It also describes the use of distributed computing systems and virtual machines used by cloud-based providers.

It is an object of the invention to provide a media production system and method or to at least provide the public or industry with a useful choice.

It is another object of the invention to provide a media production workflow system and method or to at least provide the public or industry with a useful choice.

SUMMARY

According to one example embodiment there is provided a method of modifying metadata associated with a media file comprising:

receiving a first media file;

receiving a first metadata associated with the first media file;

receiving an identifier of a second media file; and modifying the first metadata to include the identifier of the second media file.

Preferably the first metadata is embedded in the first media file.

Preferably the identifier of a second media file is embedded in the first media file.

Preferably the first metadata includes a progressive time code associated with at least one portion of the first media file having a start time and end time; and the method further comprises:

receiving second metadata relating to the second media file wherein the second metadata contains a start record time metadata flag and an end record time metadata flag;

determining whether the first media file start time matches the start record time metadata flag;

determining whether the first media file end time matches the end record time metadata flag;

in the event that the first media file start time does not match the start record time metadata flag; editing the first media file by creating at least one instance of the first media file in which portions of the first media file associated with the time code prior to the start record time metadata flag have been removed; and in the event that the first media file end time does not match the end record time metadata flag; editing the first media file by creating at least one instance of the first media file in which portions of the first media file associated with the time code after the start record time metadata flag have been removed.

Preferably the method is implemented on a computer system.

Preferably the method is implemented on a camera.

Preferably the method is implemented on computer or computes programmed or operable to implement the method.

Preferably computer readable media storing computer-usable instructions that, when used by a computing device, causes the computing device to implement the method.

According to another example embodiment there is provided a method of modifying a media comprising:

receiving a first media file having a first file name associated with first metadata, wherein the first media file is associated with first metadata and wherein portions of the first media file are associated with a progressive time code having a start time and end time receiving a second file name;

renaming the first media file by replacing the first file name with the second file name;

receiving second metadata relating to a second media file comprising a start record time metadata flag and an end record time metadata flag;

determining whether the first media file start time matches the start record time metadata flag;

determining whether the first media file end time matches the end record time metadata flag;

if the first media file start time does not match the start record time metadata flag; editing the first media file by creating at least one instance of the first media file in which portions of the first media file associated with the time code prior to the start record time metadata flag have been removed;

if the first media file end time does not match the end record time metadata flag; editing the first media file by creating at least one instance of the first media file in which portions of the first media file associated with the time code after the start record time metadata flag have been removed; and updating the end record time metadata flag and that the first media filename is updated to match the second file name.

Preferably the second filename is the name of a second media file.

Preferably the start record time metadata flag matches the start time of a second media file having second progressive timecode wherein portions of the second media file are associated with a second progressive time code and wherein the second progressive time code has a second start time and second end time and the end record time metadata flag matches the second end time of the second media file.

Preferably the start record time metadata flag matches the start time of a second media file having second progressive timecode wherein portions of the second media file are associated with a second progressive time code and the second progressive time code has a second start time and second end time and the end record time metadata flag matches the second end time of the second media file.

Preferably the first media file has been transcoded from the second media file.

Preferably the first and second media files have been transcoded from a third media file.

Preferably the first media file has been transcoded from a media stream

Preferably the first and second media files have been transcoded from a third media file.

Preferably the first media file has a first file size and the second media file has a second file size and wherein the second file size is substantially larger than the first file size.

Preferably the first media file is a video file.

Preferably the second media file is a video file.

Preferably the first and second video files have matching framerates.

Preferably the method further comprising creating at least one edit decision relating to the first media file; and applying the first edit decision to the second media file.

Preferably the method is implemented on a computer system.

Preferably the method is implemented on a camera.

Preferably the method is implemented on computer or computes programmed or operable to implement the method.

Preferably computer readable media storing computer-usable instructions that, when used by a computing device, causes the computing device to implement the method.

According to a further example embodiment there is provided a method of generating a media file in a computer system comprising:

receiving a media stream;

receiving first metadata associated with the media stream;

converting the media stream into a first media file;

associating at least a portion of the first metadata with the first media file;

receiving an identifier of a second media file;

modifying the first metadata to include the identifier of the second media file, wherein the first metadata includes a progressive time code associated with at least one portion of the first media file and wherein the time code has a start time and end time;

receiving second metadata relating to the second media file wherein the second metadata contains a start record time metadata flag and an end record time metadata flag;

determining whether the first media file start time matches the start record time metadata flag;

determining whether the first media file end time matches the end record time metadata flag; and ensuring that the start time and end times of the first media file match the start and end record times of the start record time metadata flag and an end record time metadata flag.

Preferably ensuring that the start time and end times of the first media file match the start and end record times of the start record time metadata flag and an end record time metadata flag comprises in the event that the first media file start time does not match the start record time metadata flag; editing the first media file by creating at least one instance of the first media file in which portions of the first media file associated with the time code prior to the start record time metadata flag have been removed.

Preferably ensuring that the start time and end times of the first media file match the start and end record times of the start record time metadata flag and an end record time metadata flag comprises in the event that the first media file end time does not match the end record time metadata flag; editing the first media file by creating at least one instance of the first media file in which portions of the first media file associated with the time code after the start record time metadata flag have been removed.

Preferably the second metadata is embedded in or attached to the first media file.

Preferably the first metadata is embedded in or attached to the first media file.

In another aspect the first metadata is embedded in or attached to the first media file.

Preferably the identifier of a second media file is embedded in or attached to the first media file.

Preferably the identifier of a second media file is embedded in or attached to the first metadata.

Preferably the second metadata is embedded in or attached to the first metadata.

Preferably the first media file has been transcoded from the second media file.

Preferably the first and second media files have been transcoded from a third media file.

Preferably the first media file has been transcoded from a media stream

Preferably the first and second media files have been transcoded from a third media file.

Preferably the first media file has a first file size and the second media file has a second file size and wherein the second file size is substantially larger than the first file size.

Preferably the first media file is a video file.

Preferably the second media file is a video file.

Preferably the first and second video files have matching framerates.

Preferably the method further comprising creating at least one edit decision relating to the first media file; and applying the first edit decision to the second media file.

Preferably the method is implemented on a computer system.

Preferably the method is implemented on computer or computes programmed or operable to implement the method.

Preferably computer readable media storing computer-usable instructions that, when used by a computing device, causes the computing device to implement the method.

According to another example embodiment there is provided a method of displaying video content to a user in a computer system comprising:

receiving from a remote client system an indication to play a video from a first point in a video stream.

generating and displaying an overlay watermark on a display at the client system whilst streaming the video stream to the client system from a server system from the point.

selecting a second point in the video stream that is later than the first point, from the second point, embed a watermark into the subject video content in real-time during streaming of the video content by at least one of:

causing burn-in of the generated watermark into a layout of the subject video content or embedding the watermark as a code in the subject video content:

Preferably allowing display of watermark information without delay in a video stream caused by generation of embedded or burnt in watermarks.

Preferably the watermark is generated by executing a plurality of massively parallel servers or processors.

Preferably the watermark information is generated by determining personal attribute information of a recipient of the subject video content.

Preferably the watermark is a personalized watermark according to the personal attribute information Preferably the user attribute information may include at least one item of information selected from the following group: User name, IP address of the remote client system, user name, user ID, current time, and current date.

Preferably an option is provided at a user interface to turn off the overlay watermark and delay streaming until the embedded or burnt-in watermark has been generated.

Preferably an option is provided at a user interface to turn off the overlay watermark and delay streaming until the embedded or burnt-in watermark has been generated if the duration of the media stream having an overlay watermark exceeds a predefined duration limit, wherein the predefined duration limit is a predefined percentage of the duration of the media stream.

Preferably the method further comprising:

detecting if a burnt-in or embedded watermarking is already present in the stream; and if the watermarking is present, disabling the overlay watermarking.

Preferably the method further comprising:

generating a burnt-in or embedded watermark in at least part of the video stream before receiving from a remote client system an indication to play a video from a first point in a video stream;

Preferably the part is selected on the basis of a priority score generated by previous user selection of streaming points in previous video viewings.

Preferably the priority score is based on how often a particular temporal region of a video stream was selected for streaming.

Preferably the method further comprising providing a video stream with content-related metadata generating a burnt-in or embedded watermark in at least part of the video stream before receiving from a remote client system an indication to play a video from a first point in a video stream.

Preferably the part is selected on the basis of at least one of A priority score generated by previous user selection of streaming points in previous video viewings.

Preferably the priority score is based on how often a particular temporal region of a video stream was selected for streaming.

Preferably the priority score is based on how often regions of selected content metadata were selected for streaming.

Preferably the priority score is based on whether or not the streaming is streamed from a first media file.

Preferably the first media file has at least one associated piece of metadata associating the first media file with at least a second media file.

Preferably at least a portion of the second media file was previously selected for streaming by the same user.

Preferably the associated piece of metadata is stored in a database external to the first and the second media files.

Preferably the method further comprising:

providing a video stream with content-related metadata; and generating a burnt-in or embedded watermark in at least part of the video stream before receiving from a remote client system an indication to play a video from a first point in a video stream;

Preferably the part is selected on the basis of a priority score.

Preferably the priority score is generated by selecting portions of video enclosed within pairs of metadata tags.

Preferably the metadata tags are selected from indications of useable action sequences.

Alternatively, the metadata tags are selected from indications that one or more users have selected to loop playing of video between the pairs of tags.

Alternatively, the metadata tags are selected by user input.

Preferably the method further comprising generating a burnt-in or embedded watermark in at least part of the video stream before receiving from a remote client system an indication to play a video from a first point in a video stream.

Preferably the part is selected on the basis of whether it is between a start record time metatag and an end record time metatag associated with the video streaming content.

Preferably the first media file has been transcoded from the second media file.

Preferably the first and second media files have been transcoded from a third media file.

Preferably the first media file has been transcoded from a media stream

Preferably the first and second media files have been transcoded from a third media file.

Preferably the first media file has a first file size and the second media file has a second file size and wherein the second file size is substantially larger than the first file size.

Preferably the first media file is a video file.

Preferably the second media file is a video file.

Preferably the first and second video files have matching framerates.

Preferably the method further comprising creating at least one edit decision relating to the first media file; and applying the first edit decision to the second media file.

Preferably the method is implemented on a computer system.

Preferably the method is implemented on a camera.

Preferably the method is implemented on computer or computes programmed or operable to implement the method.

Preferably computer readable media storing computer-usable instructions that, when used by a computing device, causes the computing device to implement the method.

According to a still further example embodiment there is provided a method comprising:

receiving edited media from editing platform at cloud-based media platform;

sending edited media from cloud-based media platform to first computer platform;

sending edited media from first computer platform, to first media viewing platform;

receiving annotations relating to edited media from first media viewing platform at first computer platform;

receiving annotations relating to edited media from first computer platform, at cloud-based media platform; and sending annotations relating to edited media from cloud-based media platform, to editing platform.

Preferably the first media file has been transcoded from the second media file.

Preferably the first and second media files have been transcoded from a third media file.

Preferably the first media file has been transcoded from a media stream

Preferably the first and second media files have been transcoded from a third media file.

Preferably the first media file has a first file size and the second media file has a second file size and wherein the second file size is substantially larger than the first file size.

Preferably the first media file is a video file.

Preferably the second media file is a video file.

Preferably the first and second video files have matching framerates.

Preferably the method further comprising creating at least one edit decision relating to the first media file; and applying the first edit decision to the second media file.

Preferably the method is implemented on a computer system.

Preferably the method is implemented on a camera.

Preferably the method is implemented on computer or computes programmed or operable to implement the method.

Preferably computer readable media storing computer-usable instructions that, when used by a computing device, causes the computing device to implement the method.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which:

FIG. 3 is a diagram illustrating a further exemplary prior art system;

FIG. 5 is a diagram of an exemplary method according to another embodiment;

DETAILED DESCRIPTION

Figure 1:
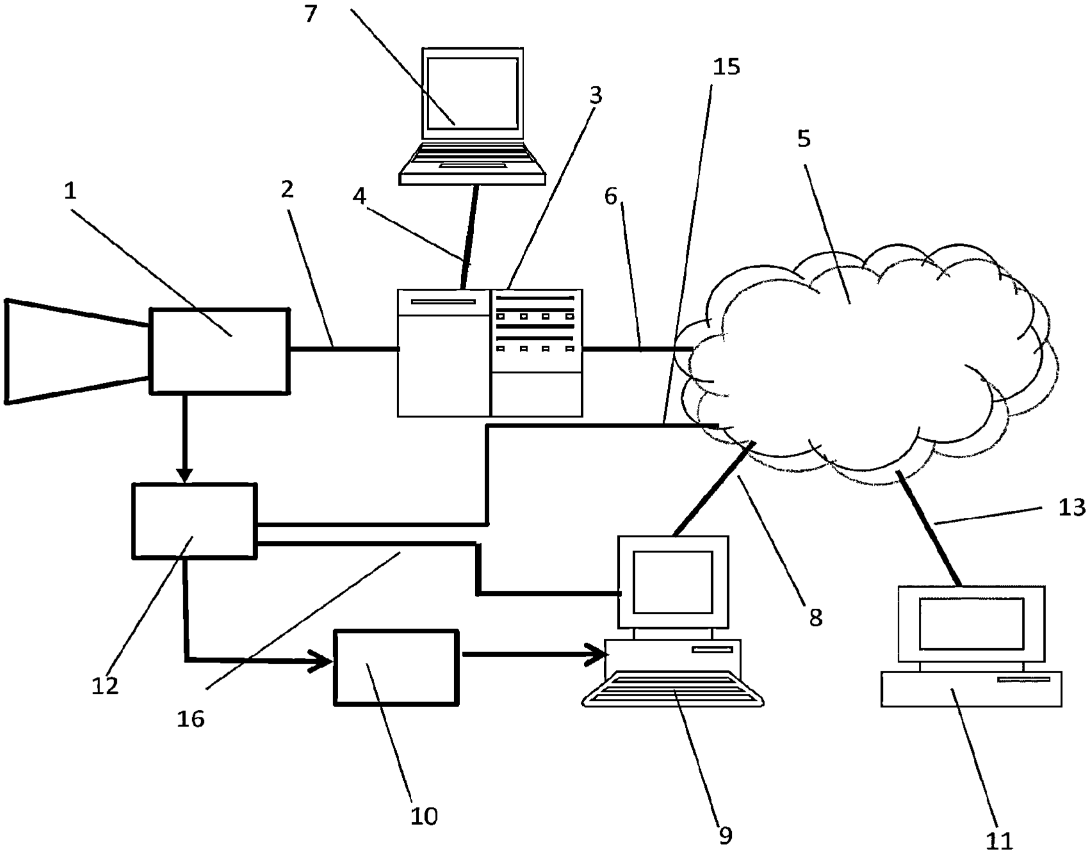
FIG. 1 is a block diagram of an exemplary prior art system.

FIG. 1 depicts a high-level block diagram of an exemplary prior art system. In a typical video production workflow, media files such as video data files, audio data files and metadata are generated at one or more capture devices such as an audio recording device or an image capture device, such as camera 1. Typically, first version data files are recorded on media such as camera cards at camera 1. Camera 1 may optionally capture audio. Camera 1 may alternatively or additionally capture motion information, or 2- or 3D surface profiles of a static or dynamic environment. Camera 1 may record inside our outside the visible range of light, and may in particular perform hyperspectral imaging and may include an active 3D scanner. Camera 1 may also capture or sense magnetic fields, electromagnetic fields, and may actively retrieve data by emitting energy to interrogate the environment, for example by means of sonar, radar or lidar.

The video, audio and metadata may be combined in various ways into files.

Essence is the part of the file containing the actual data (e.g. audio and video) as opposed to the metadata.

Metadata can include: The Camera's or the lens metadata such as f-stop or focal length, shutter speed, gps coordinates, time of day, user data such as shot name and comments, timecode, camera ID (serial number) aspect ratio, tape number, frame,,camera speed, shutter angle, iris, zoom, tilt, roll, iod, conv or other data added by a linked laptop or tablet, sound or script supervisor reports, and metadata created by camera-specific viewer software. metadata created by camera-specific viewer software. It may include clip name, titles, comments/description,status, Kelvin,tint, ISO, CDL, LUT values, sound offsets, sync points, slate points and many other fields.

Audio, video and metadata may be transmitted separately, or one or more of them may be combined in the same wrapper such as a MXF file (Materials exchange Format) file. For example, MFX OpAtom is a media type designed to keep the audio and video elements discrete, yet tied together in a single clip. Other files that may carry metadata include: ALE, AAF, OMPF and XML files.

The data recorded at these capture devices are periodically transferred to a data transfer station 12, also known as a "loader station" where they are backed up to one or more additional media drives (not shown).

The data transfer may occur when the recording media are still loaded internally or externally at the camera, but typically they are swapped out and backed up at data transfer station 12. data transfer station 12 typically includes download/ingest software that logs all file transfers, allows generation of additional metadata by accepting user input—for example naming of reels/mags, and performs, transcoding, Colour correction and high-speed backup to multiple destinations Media file integrity may be checked in various ways at data transfer station 12 for example by a cyclic redundancy check (CRC) which may include for example a MD5 checksum comparison of the files recorded by camera 1 and those recorded at data transfer station 12.

Data transfer station 12 will also transfer copies of the media files to one or more examples of a data-bearing medium 10 known as a "shuttle drive" This is used to physically transfer first version media files to user systems such as editing platform 9. First version-media files may include formats such as AJA Ki Pro Quad, AJA Ki Pro/Rack/Mini, Gemini recorder, Sound Devices PIX 240 recorder, Codex, Open EXR 16 bit, DPX 10 bit (RGB, YUV), TIFF 16 bit, Indicam RAW in MOV, Cinema DNG, SI-2K, Cineform RAW in MOV, MP4, CDX Native RAW, P2/MXF,, MXF,Phantom Flex, Flex4K, Miro,.cine RAW, H.264 QuickTime MOV, Canon MXF, THM files, PRORES, RAW4444, 422, HQ, LT, Proxy, REDCODE RAW,, HDRx, RMD files,,SStP,ProRes,DNxHD, ARRIRAW,ARRIRAW A65,RAWR3D, SI, Cineform,Phantom and others.

Furthermore, at data transfer station 12, an additional set of second version files (DIT clips) will typically be generated from the camera originals. These are typically Avid MXF files these DIT clips are usually accompanied with an ALE file to populate the metadata at editing platform 9. These DIT clips and ALE files are typically transferred to editing platform 9 either physically or via a network link such as seventh communication link 16.

These may be used for offline editing.

The DIT clips may also be supplied to media platform 5 using sixth communication link 15 for transcoding and transfer to editing platform 9 and second media viewing platform 11.

Alternatively, second version files may be generated by camera 1 and stored on the camera cards alongside the first version media files. Alternatively, second version clips may be stored on separate cards that may be swapped for data transfer independently of the cards used to store first version files. For example, the second version files may be stored on SD cards, while the first version files are stored on CFAST cards. These second version files are typically transferred to the data transfer station 12 on the SD cards, as well as still image files and metadata that have been generated by the camera and will then be made available via, for example seventh communication link 16 to editing platform 9.

Camera 1 typically generates first version media files and a lower-resolution media stream such as a video output stream. The lower-resolution stream typically uses less data to portray a given length of media file than the corresponding first version files. This may be achieved using various combinations of lossy and/or lossless compression. The lower-resolution media stream usually contains at least some metadata which corresponds to data in the first version files. The lower-resolution media stream is typically transmitted over first communication link 2 to a first computer platform 3. In particular, the stream typically contains metadata which identifies the corresponding first version files. Such metadata can be, but is not limited to, the principal name of the corresponding first version file. Examples include a Camera Media File Name, TAPE NAME, tape ID.

Additional metadata received from camera 1 at first computer platform 3 includes the start and stop recording timecode for each first version file. This indicates when camera 1 began and stopped recording each particular first version file.

First computer platform 3 typically converts or transcodes the camera 1 media stream to second version media files in one-or more different formats. These converted media files may be of lower resolution than the media stream that are received at first computer platform 3.

The first version media files and the second version media file contain at least one temporal segment that was contains data generated by signals from the same sensor. The sensor may be a data capture device such as a camera or microphone. In the event that the first version media files and the second version media files have frames, at least one frame in the first version media files and the second version media files may both have data generated by signals from the same sensor. Although first version media files and second version media files may not be of the same length, there may be matching metadata between the first version media files and the second version media files. For example, in the event that the first version media files and the second version media files have frames, at least one frame of a first version media file may have timecode that matches a frame in a second version media files. Second version media files may be created by transcoding from first version media files.

In the event that first version media files and the second version media files are associated with progressive timecode, when averaged over a given length of timecode, second version media files may contain less data than the first version media files.

Second version media files may have a lower sampling rate than first version media files.

Second version media files may have a greater compression than first version media files.

Second version media files may have a lower resolution than first version media files.

Codecs used may include, for example, but not be limited to: H.264, ProRes 4444, ProRes 422, ProRes 422 (HQ), ProRes 422 (Proxy), DNxHD LB 1080p 36 8-bit (OP-Atom), DNxHD SQ 1080p. 145/120/115 8-bit (OP-Atom), DNxHD HQ 1080p 145/120/115 8-bit (OP-Atom), DNxHD HQX 1080p 220/185/175 10-bit (OP-Atom), DNxHD SQ 720p 145/120/75/60 8-bit (OP-Atom), DNxHD HQ 720p 220/185/110/90 8-bit (OP-Atom), DNxHD HQX 720p 220/185/110/90 10-bit (OP-Atom). Selection of resolution, bitrate, channel layout (e.g. selection of tracks), compositing, colour grading, aspect ratios, overlays, burn-ins, metadata export e.g to XML, ALE, JSON or .FCPXML files may also take place at first computer platform 3, as may the generation of reports in different formats such as PDF, CSV, or HTML. Transcoding may also be run as a background process and may be performed by pre-selected processors, either internally or via a "cloud-based" set of processors that operate on segmented media files. Transcoding may take place to multiple different files of different attributes (e.g. codec) in parallel, for example the simultaneous transcoding to e.g. DNx 36 1080p and H.264 720p in only one transcoding pass. The metadata which identifies the first version file which corresponds to a particular second version file created at first computer platform 3 is typically stored in a database at First computer platform 3 and is associated in the database with the corresponding second version file. The database may be a postgre database which can be named and/or have their metadata set to be the TAPE NAME of the corresponding first version file. The second version file can for example, be given the same name as the corresponding first version file. Alternatively, metadata stored in relation to the second version file can be set to identify the corresponding first version file. This allows, for example, an editor the ability to link back to the first version files for online editing, or to re-link to later higher quality second version proxy files created by data transfer station 12. Note that the relationship between corresponding second and first version files need not necessarily be stored in a database but may be implemented using, for example, a flat file system.

First computer platform 3 may optionally add an overlaid watermark to media files to deter copying or retransmission. The watermark may be of variable transparency. It may also allow users to take screenshots of media files, and may store and cache media files and metadata. It may manage permissions for multiple users to export metadata, take screenshots, create reports, add and delete metadata fields, and generate reports.

These converted media files, along with additional metadata that may have been received from camera 1, received from other inputs to first computer platform 3 or generated at first computer platform 3, for viewing via second communication link 4, which may for example be a local wired or wireless network connection, at media viewing platform 7 so that it may be viewed locally by cast and crew. First computer platform 3 typically includes a server function to provide media files to media viewing platform 7 and other recipients. The server function may be connected to the transcoding hardware of first computer platform 3 bt one or more communication links (not shown) such as a wireless or wired network. Access to first computer platform 3 may be via one or more of user ID, password, or a hardware dongle to provide license credentials. Authentication between first computer platform 3 and media viewing platform 7 may include pre-shared certificate fingerprints. certificate fingerprints may be made available from first computer platform 3 to media viewing platform 7 by means of hyperlinks transferred from first computer platform 3 to media viewing platform 7 that link to the certificates. The hyperlinks may be included in QR codes.

It is to be noted that metadata may be transmitted over first communication link 2 in multiple ways. For example, it may be sent over an audio channel to ensure transmission when a wireless network is being used. First computer platform 3 may include features such as Camera model auto-detection, support for multiple camera types and SD/HD/3G-SDI input and outputs.

Media files and associated metadata may also be transmitted from first computer platform 3 via third communication link 6 to media platform 5. Note that the associated metadata sent from first computer platform 3 to media platform 5 may be a subset of that received at first computer platform 3. However, it does typically contain the start and stop recording timecode for each first version file. The start and stop recording timecode received from camera 1 may undergo additional processing at computer platform 3 before being sent to media platform 5. For example, it may be renamed (e.g. as "record trigger metadata"), or stored in a different format or different database entry.

Metadata sent from first computer platform 3 to media platform 5 and associated with the second version files may, for example inherently identify the corresponding first version file associated with a given second version file. For example, it may have a REEL ID is usually the same as TAPE name or ID of the corresponding first version file and is set using the Camera Card name plus the 4 random symbols from the card.

Furthermore, additional metadata may have been added or created at first computer platform 3 and passed onto media platform 5. For example, a human operator at first computer platform 3 may manually add "in and out points" that are selections of timecode that refer to the operator's selection of footage, for example footage that is deemed by the operator to be useable or relevant. The associated metadata sent from first computer platform 3 to media platform 5 may be for example, be in JSON format and may be sent by communication with an API at media platform 5 over third communication link 6.

Media platform 5 includes one or more computer systems, which may be at least partially arranged in massively parallel "cloud" architecture to facilitate transcoding, watermarking and other processor-intensive processes. At media platform 5, the media files may undergo further processing such as transcoding, audio and video synchronization in which the timecode of one media file is re-set to the timecode of another media, or burn-in or embedding of watermarks or fingerprinting (forensic watermarking). Furthermore, looks or colour grading templates may be applied at this stage.

Transcoding may be to a wide variety of formats, for example a format compatible for offline editing at editing platform 9 such as DNxHD, Metadata may be added, or modified or processed into new file formats. For example, an EMD file may be created, that has file information corresponding to sound, timecode, timecode offsets, camera names, file names, Avid bins, Avid sync points, CDL information, LUT information, camera magazine serial numbers and the like. An additional file such as an ALE file may be generated that is compatible to be imported into editing software at editing platform 9. The ALE file may link to the already-transcoded offline quality DNxHD files and populate the bin columns of editing software at editing station 9 with, metadata including, for example, Kelvin,tint, ISO,LUT, CDL values, sound offsets, sync points, slate points and other metadata.

After processing, media platform 5 may make media files available for viewing at one or more second media viewing platforms 11. Second media viewing platform 11 may include means to add or update metadata relating to media files such as annotations to the files, messages that may be received by other media viewing platforms 7 or 11 or editing platform 9 or elsewhere.

Media platform 5 will typically manage permissions for users of second media viewing platforms 11 by assigning permissions to view, annotate, comment on or otherwise interact with media files. Users of second media viewing platforms 11 may be required to log on using user ID, password, or a multi-factor authentication method such as a challenge/response via an email or other message or message to a device associated with the user. Media platform 5 will typically gather and store data from second media viewing platforms 11 concerning when the footage was viewed, annotations made and the like.

Media files and metadata may also be made available via fourth communication link 8 to editing platform 9. At editing platform 9 an editor will typically edit the media files creating additional data relating to a desired edit of the media files, such as an edit decision list (EDL). The EDL may be in a format such as CMX3600, XML, xspf, AAF, AviSynth or ALE which allow one system to read and conform to another's timeline.

The Open Media Framework (OMF), which is described in the OMF.™. Interchange Specification available from Avid Technology, Inc., a corporation in Tewksbury, MA. This specification states that the OMF interchange format provides a standard for the interchanging of digital media data among heterogeneous platforms. Another effort is the Advanced Authoring Format (AAF), which is described at the website (www.aafassociation.org). More particularly, as described therein at: (www.aafassociation.org/html/techinfo/index.html), the AAF is a multi-media file format, which allows the exchange of digital media and meta-data across platforms and between systems and applications.

AVID ALE is Avid Log Exchange. This is a file containing references to each separate clip that can be relinked to the MXF files. It also contains all the essential metadata related to those clips, such as Reel ID, TimeCode and Color Decision Lists.

AAF is short for "advanced Authoring Format" which provides better management and easier sharing of picture and sound information and metadata across multiple computer platforms and authoring tools. Events such as transitions, colour shifts and audio parameters are contained and transmitted using AAF files. The Advanced Media Workflow Association has published a whitepaper detailing this format and it t is described at the website (www.aafassociation.org). More particularly, as described therein at: (www.aafassociation.org/html/techinfo/index.html), the AAF is a multi-media file format, which allows the exchange of digital media and meta-data across platforms and between systems and applications.

When the first version files arrive at editing platform 9, for example over a network connection or via a data-bearing medium 10 such as a hard drive, the data created at editing platform 9 will typically be applied to the first data.

However, a difficulty typically arises when editing decisions that were created in relation to a second version media file are to be applied to the first version media files. The editing data created at editing platform 9 is typically applied to particular data relating to the second version media files, which is temporally dependent, such as timecode, Difficulties may arise, for example, during the process of conforming.

Conforming is taking an offline sequence and moving it to an online edit bay in preparation for final mastering. The conform involves using the offline version as a guide and matching the online version shot for shot (to the exact frame). When needed for online editing or re-edits, only the specific frames that are part of the actual cuts used need be automatically retrieved from the storage system. If required, additional handle frames can also be retrieved. This saves throughput during transfers and storage occupation when deduplicating frames. All the frames belonging to shot clips that will not be used for a specific asset, such as wrong takes, alternate takes, tests, bad claps, etc., will not be considered for transfer. The pre-conforming phase is thus performed within the storage system, not in the post-production facility. This approach spares time for data transfer, time for manual conforming and space for storing unnecessary video frames.

When using, for example, camera proxies, the timecodes, clip names and clip lengths will usually be the same, so there is no difficulty in matching them. However, difficulties arise when attempting to match online first version footage with second version footage captured and/or transcoded at first computer platform 3 as the timecode and the length of the second version files and first version files are often different.

The reason for this is due to errors that arise in one or more of Camera 1, first communication link 2 and first computer platform 3. These errors cause the metadata received at first computer platform 3 which establishes the timecode and length of the media files received at first computer platform 3 to be incomplete, corrupted or absent. In particular "start recording" and "stop recording" signals from Camera 1 may not be registered at first computer platform 3. Therefore, to void loss of media data from a missed "start recording" signal, first computer platform 3 will typically begin transcoding and/or transmitting and/or recording media data files from camera 1, before any "start recording" signal is received from camera 1. Therefore, second version media files will sometimes have different length to the corresponding first version files.

Another problem is that the on-set personnel using first media viewing platform 7 may wish to review media data that was generated at editing platform 9, such as, for example, edited versions of video or audio footage, and would like to add annotations or instructions to the footage to be sent back to editing platform 9, but there is currently no way of doing so. In particular, access to instances of second media viewing platform 11 may not be available due to network or other difficulties.

Media platform 5 will typically add additional metadata to media files that are received at media platform 5 either from first computer platform 3 or from editing platform 9. In particular media platform 5 will add visible and/or invisible digital watermarking to the media files to attempt to deter copying or unauthorized retransmission of the files.

This will typically include data sent from first media viewing platform 7 editing platform 9 or second media viewing platform 11. Such as a user ID, email address, IP address and a timestamp which may be generated at any location in the workflow, but typically at media platform 5.Media platform 5 may embed a general watermark into a pre-roll of the subject video content before streaming and embed the personalized watermark into the subject video content during streaming. In such embodiments, streaming the subject video content can include transitioning from the pre-roll watermarked content to the personalized watermarked content after the personalized watermark is embedded into the subject video content.

If visible, the watermark may be in the form of an overlay, which is applied to a media viewing platform visual display. However, a problem with this approach is the original media is still transmitted to at least one of media viewing platform 7 editing platform 9 or second media viewing platform 11. Therefore it is quite easy to remove the overlay and recover the original files.

A second method is that the watermark is embedded or "burnt in" to the media files. This is typically done at media platform 5 by segmenting the media files and using massively parallel processing to burn in or embed the watermarks.

Personalized watermarking is applied at the video stream level by burning-in (destructive marking) user identifiable information into a video stream, on demand. In destructive watermarking, the video segment is decoded to baseband video data, an overlay of text and/or image(s) is applied, and video data is re-encoded to produce the output segment. In forensic watermarking, a payload is applied to the segment, using techniques specific to the forensic technology, to produce the output segment. Every video stream post-watermarking is therefore unique and can be traced back to the person who was authorized, thereby identifying the source of any leaked content.

In this process, a user at least one of media viewing platform 7 editing platform 9 or second media viewing platform 11 requests video playback, and if pre-roll segments exist for the video playback, then the pre-roll segments are played. If the request for video playback includes watermark settings (, then user information and a watermarking template format is retrieved from a database. The user information and a watermarking template format may include information such as the user's name and email, for example. A watermarked segment cache is checked for already existing watermarked segments. If at least some watermarked segments already exist then those segments are played; however, if there are segments that are not already present in the cache, the method, executing in parallel to the portion of the video being played, watermarks the video segment using the user information and a watermarking template to form personalized watermarked segments for playback.

A problem with this technique is that the process is time consuming. Typically, there may be a delay of between 5-15 seconds between when a request is made from a media viewing platform 7 or 11 to stream a media file and when the media file actually plays.

Refer now to also to FIG. 3, which shows a diagram for one prior art method of an embodiment.

The following steps are performed:

Sending Metadata and video data from camera to first computer platform 17;

At first computer platform, transcoding second version video into second version video files 18;

Sending second version video files and metadata from first computer platform to cloud-based media platform 19;

At cloud-based media platform, additional transcoding of second version video files 20; and Transferring second version video files from cloud-based media platform to editing platform 21.

Metadata Updating

An embodiment will now be described, again in relation to FIG. 1. As mentioned above, the second version media files received at media platform 5 may have a different timecode and length to the first version files that are received at editing platform 9. This can cause problems, as for example, an editor using editing platform 9 could begin cutting using second version footage for which there is no first version footage available. Therefore, the present system and method ensures that the second version files can be matched to the first version files. Metadata concerning the first version files is transferred from Camera 1 via first communication link 2 to first computer platform 3 and thence via third communication link 6 to media platform 5.

The metadata concerning the first version files may include one or more of the TAPENAME or CAMERA NAME or CAMERA FILE NAME, the name of the first version file, and the start and end timecode or timecode flags of the first version file. The CAMERA FILE name, may for example may include random letters and date and/or time data and may be used as a TAPENAME.

Figure 4:
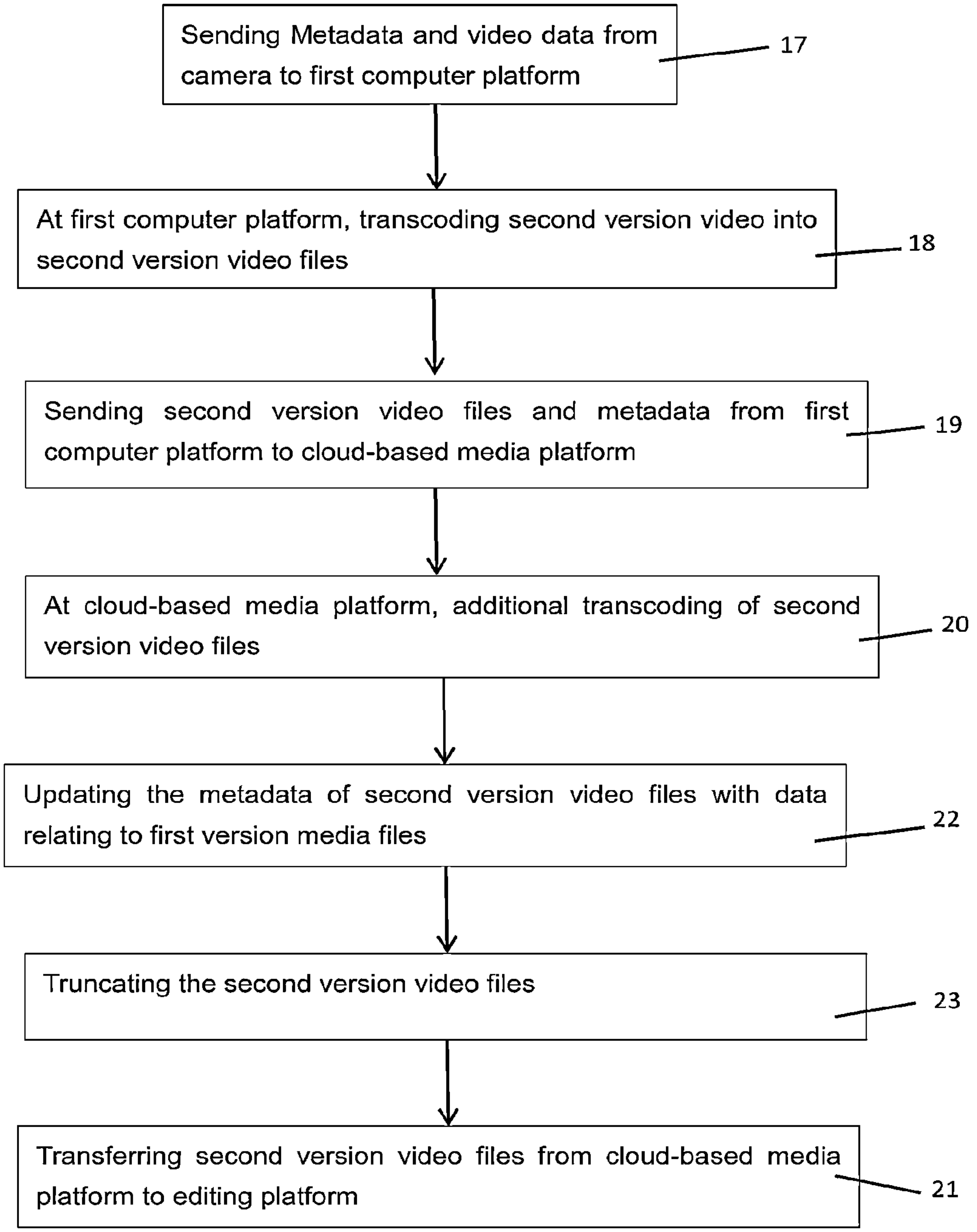
FIG. 4 is a diagram of an exemplary method according to an embodiment.

Refer now to FIG. 4, which shows a simplified diagram for one embodiment.

Steps 17 to 2 are substantially the same as described in relation to FIG. 3.

However, the following steps are also performed:

Updating the metadata of second version video files with data relating to first version media files 22. For example, at media platform 5, the second version files (perhaps after additional transcoding) have their metadata modified to have the same TAPENAME metadata as the corresponding (camera original) first version file. This allows the editing software at editing platform 9 to match the tape name and timecode with the first version camera original files as they arrive at editing platform 9. For example, CMF (Camera media file) metadata associated with the second version file may be modified to the same as the corresponding first version file. A DOX file associated with the second version file may have the DNX metadata populated with the CMF name.

Truncating the second version video files 23.

Furthermore, at media platform 5, the camera start record time and end record time metadata flags of the first version files are associated with the corresponding second version files using the following truncation procedure.

Metadata including camera start record time and end record time timecode values is loaded into memory. The timecode of the second version files is loaded into memory and compared with the camera start record time and end record time timecode values of the metadata.

Any frames, audio tracks or other data or metadata in the second version file associated with timecode prior to the camera start record time are removed from the file.

Any frames, audio tracks or other data or metadata in the second version file associated with timecode after the camera end record time are removed from the file.

Therefore, the second version files have the same length as the first version files. This has the advantage that, if the second version files from media platform 5 arrive at the editing platform 9, and editing decisions are made, it is possible for the editing software to replace the second version files from media platform 5 with DIT clips from data transfer station 12 when they arrive. This could be advantageous, because DIT clips are typically higher resolution than the second version files from media platform 5. The DIT clip filenames when transferred to editing platform 9, are typically the same as the first version (camera original) file TAPENAME metadata.

Editing platform 9 may include functionality that, when second version files are received from media platform 5 or data transfer station 12 will auto populate the BINS in an editing device at editing platform 9 with metadata associated with second version files included.

The renaming of filenames of DIT clips at data transfer station 12 the first version (camera original) file TAPENAME metadata can be performed by a software algorithm either locally or in one or more remote computers such as a cloud computing system. Preferably the DIT clips and the second version files have the same framerate.

This truncation of the second version files may take place at media platform 5 before or after additional transcoding. If additional transcoding takes place, a version of the file prior to truncation is typically retained at media platform 5.

As an alternative to truncation, metadata tags that indicate "in and out" points for the editing software could be generated from the metadata associated with the first version file and then the tags are associated with the second version file. They may, for example, be encoded in an ALE file that is transmitted from media platform 5 to editing platform 9.

This allows editing software at editing platform 9 to flag the parts of the second version files that have corresponding parts in the first version files from data transfer station 12.

As an alternative to the use of the camera start record time and end record time metadata flags for truncation and/or generation of editing tags, content recognition could be used to determine the camera start record time and end record times. For example, often the media files arriving at media platform 5 or the media stream arriving at first computer platform 3 includes a visual symbol of whether the camera is recording or not. This is typically an alphanumeric display of a distinctive colour. For example, the letters REC in red indicate that the camera is recording, and the letters, STBY in green indicate that it is not. Therefore media platform 5 can be configured to perform one or more of pattern recognition or colour recognition in a given region of each frame and determine whether the camera is recording or not. It may then directly truncate and/or tag the second version files as described above, or generate camera start record time and end metadata flags for later processing. If a media file includes a visual component, the metadata may also be added to the visual component. For example, it may be encoded in a visible or invisible manner in the visual component of a media file. For example, it may be encoded in frames of a video file. Preferably, if the metadata is encoded in the frames of a video file, wherein the frame defines an outer boundary, it is encoded in one or more regions substantially adjacent to the boundary, thereby to minimize user visual disturbance.

Often the media files arriving at media platform 5 or the media stream arriving at first computer platform 3 include burnt in timecode on the frame.

Therefore, alternatively, computer platform 3 or media platform 5 can be configured to perform pattern recognition of the timecode of the media stream or second version files respectively and compare it to the time code metadata of the first version files. In the truncation step, second version media files may have frames deleted for which there is no equivalent time code in the first version files, and which are not in between start and stop recording tags. The start and stop recording tags may be taken from the metadata associated with the first version files or inferred by content recognition as described above. In the event that frames exist in the first version files for which there are no equivalent frames in the second version files between the start and stop recording tags, then an alert condition may be generated. In particular, media platform 5 may request a re-transcode of the second version files from computer platform 3.

Additional metadata concerning in and out points of first version files may be obtained through additional data channels. For example, a networked sensor attached to or in close proximity to the camera could detect when the camera is recording by passively monitoring electromagnetic emissions either in the radio frequency or visible spectra. In particular, a sensor in proximity to a "recording" light or LED on a camera could detect whether the camera was recording or not. Camera event loggers or other devices that attach to a data port in the camera could also monitor camera recording times.

Alternatively, first computer platform 3 may be a portable device physically attached to camera 1. Metadata such as scene and take information would then be fed to first computer platform 3, for example via additional data capture devices over computer networks. first computer platform 3 could cache transmit both second version files on demand to, for example, first media viewing platform 7 as well as provide live access to the data stream received from camera 1.

The transcoding (if any) of the second version files and the updating of metadata of second version files and the truncating of the second version files (if performed) and the tagging of the second version files with "in and out" data may be performed in any sequence whatsoever.

Furthermore, additional metadata received at data transfer station 12 may be transmitted to media platform 5 via sixth communication link 15 and used to update the first or second version files at media platform 5. For example, metadata from additional sensors or devices such as camera movement records may be received at data transfer station 12 but not be available to media platform 5 from first computer platform 3. Therefore, media platform 5 may receive it directly from data transfer station 12 and add it to the metadata associated with media files received from one or more of first computer platform 3 and data transfer station 12.

Error Conditions

Additional procedures may be followed in the event of other missing data at media platform 5. For example, if a second version media file received at media platform 5 has missing content or is shorter than the corresponding first version file, or has a camera start record time after the camera end record time, or the metadata is missing one or more of the camera start record time and end record time then an error condition may be flagged at media platform 5.

If an error condition is flagged at media platform 5 then an alert message may be sent over a communications network. The alert message may be sent to one or more of Camera 1, first computer platform 3, first media viewing platform 7, editing platform 9, second media viewing platform 11 and data transfer station 12. The alert message will identify one or more of each second version media file and equivalent first version file associated with an error condition and may generate a visual or audible message to alert a human operator to the error. Alternatively, an alert message may trigger a response at data transfer station 12. Data transfer station 12 may have a second version file equivalent to the one for which an error condition was flagged at media platform 5.

The equivalent second version file from data transfer station 12 may then automatically be sent to one or more of, first computer platform 3, media platform 5, first media viewing platform 7, editing platform 9, second media viewing platform 11 and data transfer station 12 using the communications channels described, in order to substitute for the second version file that generated the error condition.

If, when the alert message is generated, an equivalent second version file is not available at data transfer station 12, Data transfer station 12 will wait until it is available before sending it to one or more of the recipient systems outlined above. Data transfer station 12 will typically send a message to all recipient systems that a file will be made available in the future. An equivalent second version file may be delivered via, for example a camera card from camera 1 to data transfer station 12 where it may be then transmitted over a communications network to substitute for the file associated with the error condition. Alternatively, data transfer station 12 may wait until an equivalent first version file is received, for example via a camera card from camera 1 and then transcode a equivalent second version file from the first version file. The equivalent second version file from data transfer station 12 may then automatically be sent to one or more of, first computer platform 3, media platform 5, first media viewing platform 7, editing platform 9, second media viewing platform 11 and data transfer station 12 using the communications channels described, in order to substitute for the second version file that generated the error condition.

If the first version files from the camera card or the equivalent second version files from the camera card, when received at data transfer station 12 may be accessed directly by, for example first computer platform 3 or media platform 5,. then the transcoding and distribution of substitute files may take place from first computer platform 3 or media platform 5 instead of data transfer station 12.

Alternatively, rather than obtaining metadata relating to the first version (camera original) files from first computer platform 3, the metadata may be transferred from data transfer station 12 via 15 sixth communication link to media platform 5.

Additional Alerts and Error Conditions

A media file database may be generated at one or more of Camera 1, first computer platform 3, media platform 5, first media viewing platform 7, editing platform 9, second media viewing platform 11 and data transfer station 12 but preferably at media platform 5.

The media file database may store data about media files received at media platform 5, and data transfer station 12. This data includes media file names, file sizes, file, time code start and finish, length, and metadata associated with the files. The media file database will also log file transfers from data transfer station 12 and media platform 5 to other entities in the network such as camera 1, first computer platform 3, first media viewing platform 7, editing platform 9, and second media viewing platform 11. The media file database will record file transfers of the same equivalent files from data transfer station 12 and media platform 5 to for example, editing platform 9 and thereby maintain a continuous record of which equivalent files have been delivered multiple times to editing platform 9.

The media file database also runs queries to compare media file names, file, time code start and finish, length, and metadata associated with the files received at data transfer station 12 and media platform 5 and generates alerts as specified above if inconsistencies are found.

In particular, if a second version media file is received at data transfer station 12 for which no equivalent exists at media platform 5, then an error condition and alert is generated.

Furthermore, if a second version media file is received at media platform 5 for which no equivalent exists at data transfer station 12 and a greater than or equal number of second version media files have been received or generated at data transfer station 12 than at media platform 5 then an alert is generated and transmitted to one or more of Camera 1, first computer platform 3, first media viewing platform 7, editing platform 9, second media viewing platform 11 and data transfer station 12.

In particular, if more second version or first version media files are received or generated at data transfer station 12 than have been received at media platform 5, then an error condition and alert is generated.

Availability alerts may also be generated at media platform 5. For example, media platform 5 may receive availability alert criteria from, for example, first media viewing platform 7, editing platform 9, and second media viewing platform 11, typically in response to user input at those devices. The availability alert criteria received at media platform 5 specify conditions for media platform 5 to generate availability alerts and send them to users of first media viewing platform 7, editing platform 9, and second media viewing platform 11. The availability alerts indicate that new media files are available for the user to view or download from media platform 5. The criteria that may be specified can include:

A frequency of alerting. For example a user may opt to receive a notification of media file availability at a specified interval, for example every 15 minutes if a new file is available, or every hour and so forth. Additional criteria may correspond to metadata concerning media files available at media platform 5. For example, a user may specify that alerts are only to be generated when metadata concerning the media files has changed. This metadata may include any metadata criterion previously specified, and may include for example, a change of scene, a change of camera, a particular location e.g. GPS metadata, a change of camera lens etc. The availability alerts may be sent directly to a graphical user interface at first media viewing platform 7, editing platform 9, and second media viewing platform 11 or may be sent to any other device associated with a user of first media viewing platform 7, editing platform 9, and second media viewing platform 11. For example, availability alerts may be sent as an on-screen graphic, audible tone, email or a message sent to a portable device such as a mobile phone associated with a user of first media viewing platform 7, editing platform 9, and second media viewing platform 11.

Media platform 5 may furthermore generate and send to first media viewing platform 7, editing platform 9, and second media viewing platform 11 data associated with the media availability alert allowing first media viewing platform 7, editing platform 9, and second media viewing platform 11 to display a graphical representation of selectable media files for download or streaming from media platform 5 which have been filtered to only include files selected in accordance with the criteria corresponding to the media availability alert. Therefore, the user may quickly browse and select for viewing, annotating or editing, only media files corresponding to criteria that he or she previously selected.

Real-Time Stream Commenting

Figure 2:
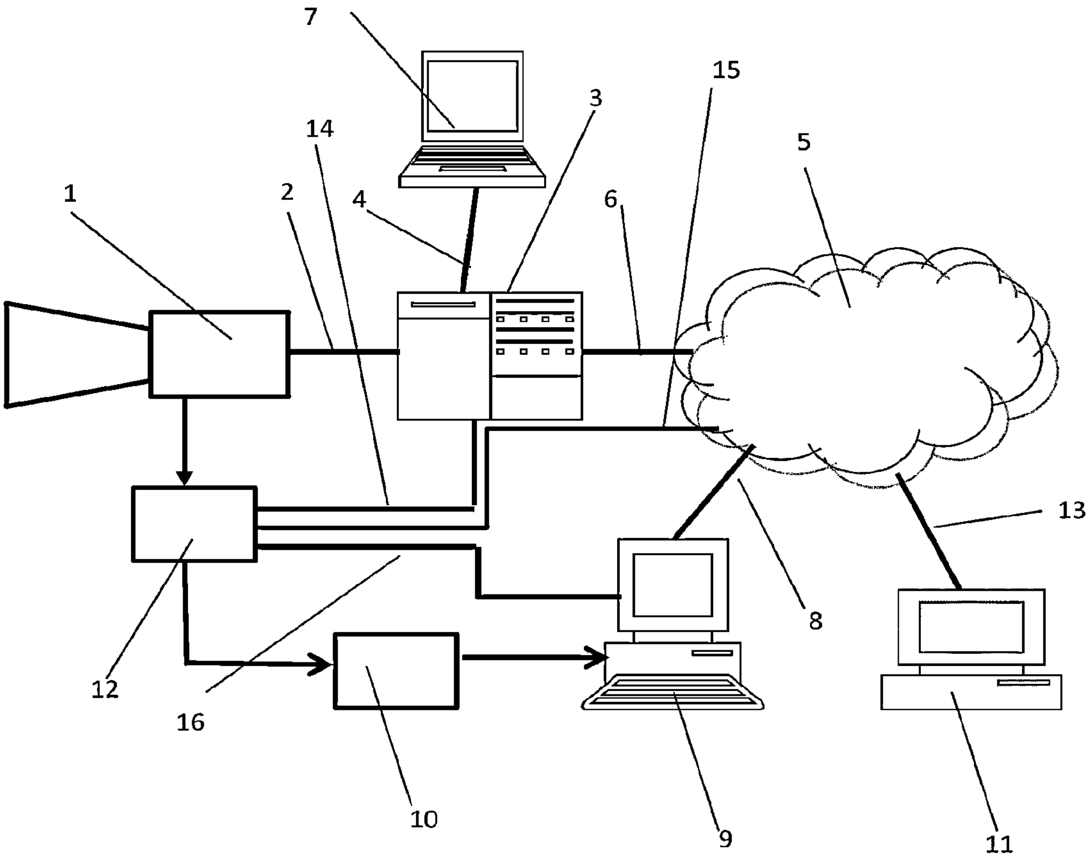
FIG. 2 is a block diagram of an exemplary system according to an embodiment.

Refer now to FIG. 2.

The lower-resolution media stream is typically transmitted over first communication link 2 to a first computer platform 3. This may be re-streamed in real-time from first computer platform 3 to first media viewing platform 7 over second communication link 4 and to Media platform 5 over third communication link 6, Media platform 5 may restream the media stream, to, for example, editing platform 9, second media viewing platform 11, and data transfer station 12.

Therefor the media recipient group devices include for example, media platform 5, first media viewing platform 7, editing platform 9, second media viewing platform 11, and data transfer station 12.

At least some of the first media stream recipient group devices such as for example one or more of eighth communication link 34 to media platform 5 and over ninth communication link 35 to first media viewing platform 7,may be connected via a a peer-to-peer network such as a peer-to-peer wireless network such as a wireless mesh network or ad hoc network. Therefore the stream may be retransmitted amongst the first media stream recipient group devices using edge caching at the first media stream recipient group devices. The media stream may be received at one or more of the first media stream recipient group devices and restreamed to any of the other first media stream recipient group devices with which there is a connection.

Metadata may be generated at any of the first media stream recipient group devices and associated with the media stream. Typically such metadata may be generated in real time. For example, comments may be added in real time by user input at first media stream recipient group devices.

Furthermore a user of a first media stream recipient group device may add metadata tags that are associated with timecode. These tags may include comments such as "action" and "cut" for example. Additional comments may be added and associated with portions of timecode, for example, portions of timecode between two timecode tags generated at a first media stream recipient group device.

Metadata indicating whether the media stream was being recorded at camera 1 is typically included in the media stream. First media stream recipient group devices typically do not allow certain types of metadata to be entered in respect to portions of the media stream for which no equivalent file is being recorded at camera 1, for example comments linked to timecode. Alternatively, first media stream recipient group devices will provide a warning display if user input is entered against portions of the media stream for which no equivalent file is being recorded at camera 1, However metadata that does not require reference to timecode could be received at first media stream recipient group devices and associated with a media stream even if there is no equivalent media file being recorded at camera 1. This timecode-independent metadata could include comments, such as lens information, take, scene, filter, Select (print) takes. Script supervisor notes, camera information and other information typically included in camera sheets. A first media stream recipient group device may store such timecode independent metadata once entered and associate it with subsequent media streams so as to minimize the requirement for unnecessary user input. The user of a first media stream recipient group device need only update the previously entered timecode independent metadata when it is desired to change it with respect to subsequent media streams. First media stream recipient group devices may generate media stream associated metadata without requiring user input. For example, for every media stream for which there is associated metadata indicating that the stream is being recorded at camera 1, the "take" filed metadata may be automatically incremented.

Metadata generated with reference to a media stream at a first media stream recipient group device may be stored at the first media stream recipient group device. It may also be made available in real-time using the communications links to other first media stream recipient group devices.

Furthermore, metadata generated with reference to a media stream at a first media stream recipient group device may be transmitted back to first computer platform 3. The metadata generated with reference to a media stream at a first media stream recipient group device may then be linked to one or more of first version media files and second version media files which were recorded at first computer platform 3 substantially simultaneously with the media stream, Typically, metadata added against media stream time code will be linked to the equivalent timecode in the media file.

Timecode-independent metadata will typically be added to the media file associated with a given media stream. Second version media files on camera to which the metadata generated from the live stream has been linked may then be transmitted to other computing devices such the first media stream recipient group devices along with metadata generated from the live stream.

Alternatively, metadata generated with reference to a media stream at a first media stream recipient group device may be linked to one or more of first version media files and second version media files at one computing device that receives one or more of first version media files and second version media files, in particular at media platform 5 or first computer platform 3 or data transfer station 12. Typically, first media stream recipient group devices will transit their metadata generated with reference to a media stream to one device such as first computer platform 3 or media platform 5 or data transfer station 12. The computing device at which the linking of the metadata generated with reference to a media stream to a media file may or may not also be a first media stream recipient group device.

Media Commenting

In another embodiment of the system and method, referring again to FIG. 1, it is desired to make the results of edited media files available to for review and comment. After editing platform 9 has received media files from, for example, fourth communication link 8, data-bearing medium 10 or seventh communication link 16, or other sources, or creates media from other data sources or operator input, editing platform 9 will typically output edited media, such as video or audio files, executable animations or the like, raw footage with a "look" or colour grade applied, VFX and the like. These edited media may be files, or a continuous stream.

These EDLs and/or edited media files created at editing platform 9 or other files such as pre-visualisations or VFX clips may be sent to from editing platform 9 to one or more of first media viewing platform 7, media platform 5,first computer platform 3 then first media viewing platform 7 using the communication links provided. In particular, they may be sent via fourth communication link 8 to media platform 5 and from media platform 5 to first computer platform 3 via third communication link 6 and then to first media viewing platform 7 via second communication link 4.

In another aspect, These EDLs may be sent to from editing platform 9 to first computer platform 3 either via seventh communication link 16 to data transfer station 12 then from data transfer station 12 to first computer platform 3 via eighth communication link 14 or via fourth communication link 8 to media platform 5 then via third communication link 6 to first computer platform 3 or by a direct communication link between editing platform 9 and first computer platform 3.

First computer platform 3 may assemble edited footage from files that exist at first computer platform 3 or that may be requested over network connections, for example from media platform 5, first media viewing platform 7, editing platform 9, or data transfer station 12. The footage assembled at first computer platform 3 may be modified by user input received at first computer platform 3 and may then be transferred as media files to first media viewing platform 7 via second communication link 4. Annotations associated with the media files assembled at first computer platform 3 may be received at first media viewing platform 7 and transferred to first computer platform 3 via second communication link 4. Media files assembled and modified by user input at first computer platform 3 may be sent to media platform 5 via third communication link 6. Media files assembled and modified by user input at first computer platform 3 may be used to generate a second EDL at first computer platform 3. The second EDL and annotations associated with the media files assembled at first computer platform 3 and the footage assembled at first computer platform 3 may be transferred from first computer platform 3 to data transfer station 12 either via eighth communication link 14 then via seventh communication link 16 from data transfer station 12 to editing platform 9 or from first computer platform 3 via third communication link 6 to media platform 5 then from media platform 5 via fourth communication link 8 to editing platform 9 or by a direct communication link between editing platform 9 and first computer platform 3. The second EDL may be used to assemble edited files at editing platform 9.

It is often desirable for personnel involved in media production to view or review the edited media. Therefore, edited media are transferred from editing platform 9 via a network link such as fourth communication link 8 to media platform 5. Media platform 5 may submit edited media to further processing such as transcoding or watermarking before making them available via fifth communication link. 13. to one or more second media viewing platforms 11 for review, comment, annotation and the like.

Furthermore, Media platform 5 may transfer edited media via a network such as for example third communication link 6 to first computer platform 3, where it may be further processed such as undergoing transcoding or watermarking before being made available via second communication link 4 to first media viewing platform 7 for review, comment, annotation and the like. Comments, review, annotations and the like generated at first media viewing platform 7, for example in relation to edited media from first editing platform 9, or other media viewed at media viewing platform 7 may then be transmitted via a communications channel from first media viewing platform 7 to editing platform 9. Examples of such channels are a direct communication link (not shown) from first media viewing platform 7 to editing platform 9. Another possibility is that comments, reviews, annotations and the like generated at first media viewing platform 7 are transmitted via for example second communication link 4 or another communications channel to first computer platform 3. First computer platform 3 then transmits the comments, review, annotations and the like generated at first media viewing platform 7 via a direct communication link (not shown) to editing platform 9.

However, preferably, comments, reviews, annotations and the like generated at first media viewing platform 7 are transmitted via for example second communication link 4 or another communications channel to first computer platform 3. First computer platform 3 then transmits the comments, review, annotations and the like generated at first media viewing platform 7 via third communication link 6 to media platform 5. Media platform 5 may then make the comments, review, annotations and the like generated at first media viewing platform 7 available via fifth communication link. 13 to one or more second media viewing platforms 11. Media platform 5 may transmit the comments, review, annotations and the like generated at first media viewing platform 7 relating to edited media to editing platform 9.

Media platform 5 may also transmit the comments, review, annotations and the like generated at second media viewing platforms 11 relating to edited media to editing platform 9.

This may be viewed with reference to FIG. 5, which shows a simplified diagram of the system and method.

FIG. 5 shows the following steps:

receiving edited media from editing platform at cloud-based media platform 24;

sending edited media from cloud-based media platform to first computer platform, 25;

sending edited media from first computer platform, to first media viewing platform 26;

receiving annotations relating to edited media from first media viewing platform at first computer platform 27;

receiving annotations relating to edited media from first computer platform, at cloud-based media platform 28; and sending annotations relating to edited media from cloud-based media platform, to editing platform 29.

An alert such as an on-screen graphic, audible tone, email or a message sent to a portable device such as a mobile phone may be used to alert a user of first media viewing platform 7 or second media viewing platform 11 of the arrival of edited media at first media viewing platform 7 or second media viewing platform 11. Preferably a silent alerting system is used.

An alert such as an on-screen graphic, audible tone email or a message sent to a portable device such as a mobile phone may be used to alert a user of editing platform 9 of the arrival of comments, review, annotations and the like generated at second media viewing platforms 11. relating to edited media at editing platform 9.

Refer now to FIG. 2 which depicts a high level block diagram of an exemplary system.

At data transfer station 12 edited media from editing platform 9 may be transferred via eighth communication link 14 to first computer platform 3 and made available for review, comment, annotation and the like at first media viewing platform 7 via for example second communication link 4 or another communication channel. Reviews, comment, annotation and the like made in relation to edited media at first media viewing platform 7 may be transmitted via for example second communication link 4 or another communication channel. to first computer platform 3. From first computer platform 3, Reviews, comment, annotation and the like made in relation to edited media at first media viewing platform 7 may be transmitted via for example eighth communication link 14 to data transfer station 12 and thence via seventh communication link 16 to editing platform 9.

Alternatively, edited media from editing platform 9 may be sent via sixth communication link 15 to data transfer station 12. At data transfer station 12 edited media from editing platform 9 may be made available for review, comment, annotation and the like.

Reviews, comment, annotation and the like made in relation to edited media at data transfer station 12 may be transmitted via seventh communication link 16 to editing platform 9, or via eighth communication link 14 to first computer platform 3 or via sixth communication link 15 to media platform 5.

From first computer platform 3 the reviews, comment, annotation and the like made in relation to edited media at data transfer station 12 may be transferred via third communication link 6 to media platform 5 and from media platform 5 to editing platform 9 via fourth communication link 8. Alternatively, from first computer platform 3 the reviews, comment, annotation and the like made in relation to edited media at data transfer station 12 may be transmitted directly by a communications channel (not shown) to editing platform 9.

From first media platform 5 the reviews, comment, annotation and the like made in relation to edited media at data transfer station 12 may be transferred to editing platform 9 via fourth communication link 8 and made available via fifth communication link 13 to one or more second media viewing platforms 11.

Alternatively, edited media may be transferred to media platform 5 from any other computer system that is connected to media platform 5, such as, for example, second media viewing platforms 11, first media viewing platform 7 via first computer platform 3, first computer platform 3, or data transfer station 12.

Alternatively, edited media may be transferred to first computer platform 3 from any other computer system that is connected to first computer platform 3, such as, for example, second media viewing platforms 11, first media viewing platform 7, media platform 5, first computer platform 3, or data transfer station 12.

Eighth communication link 14 may also be used to transfer DIT clips and first version (camera original) files from data transfer station 12 to first computer platform 3.

Another process which may be included is:

Receiving at media platform 5 at least one second version media file for which a first version equivalent file exists. Performing the truncation steps previously outlined on the second version media file. Receiving at media platform 5 an EDL from a remote system such as editing platform 9. The EDL contains instructions for editing the second version media file. By EDL is to be understood any set of instructions for editing the media file or files. It may, for example, be in other formats such as HTML, XML ALE and the like. At editing platform 9 editing the second version media file in accordance with the EDL instructions. The edited second version files are made available via the communications channels provided at, for example, one or more recipients selected from a group including:

First computer platform 3, first media viewing platform 7, editing platform 9, second media viewing platform 11, and data transfer station 12 for review and annotation and editing.

Recipients of the edited second version files may tag sections of these files and to request the equivalent sections of the first version media files by sending the tags to media platform 5. They may also request sections of first version files indicated by tags previously uploaded to media platform 5 by the same remote system or another remote system.

The first version file sections may be downloaded from media platform 5 to a recipient after editing at media platform 5 using the instructions contained in the EDL previously uploaded. By EDL is to be understood any set of instructions for editing the media file or files. It may, for example, be in other formats such as HTML, XML ALE and the like.

The first version file sections may be obtained by media platform 5 from, for example data transfer station 12 via sixth communication link 15. The first version file sections may be cached at media platform 5 prior to receiving a request from a recipient, or may be dynamically requested from data transfer station 12 via sixth communication link 15 in response to a recipient request. Furthermore, an EDL files uploaded from a recipient to media platform 5 may be downloaded from media platform 5 by the same recipient or other recipients.

For example, another process which may be included is:

Receiving at media platform 5 at least one second version media file for which a first version equivalent file exists. Receiving at media platform 5 an EDL from a remote system such as editing platform 9. The EDL contains instructions for editing the second version media file. At editing platform 9 editing the second version media file in accordance with the EDL instructions. The edited second version files are made available via the communications channels provided at, for example, one or more recipients selected from a group including:

First computer platform 3, first media viewing platform 7, editing platform 9, second media viewing platform 11, and third media viewing platform 37 for review and annotation and editing.

Recipients of the edited second version files may tag sections of these files and request the equivalent sections of the first version media files by sending the tags to media platform 5. They may also request sections of first version files indicated by tags previously uploaded to media platform 5 by the same remote system or another remote system.

The first version file sections may be downloaded from media platform 5 to a recipient after editing at media platform 5 using the instructions contained in the EDL previously uploaded.

The first version file sections may be obtained by media platform 5 from, for example camera 1 via eighth communication link 34. The first version file sections may be cached at media platform 5 prior to receiving a request from a recipient, or may be dynamically requested from camera 1 via s eighth communication link 34 in response to a recipient request. Furthermore, EDL files uploaded from a recipient to media platform 5 may be downloaded from media platform 5 by the same recipient or other recipients.

Watermark Embedding

Refer now to FIG. 1.

Typically, a user at one of first media viewing platform 7, second media viewing platform 11. or editing platform 9 (remote client systems), each of which has a visual display, will send a request to media platform 5 to view a video file from a particular point in the video. The video file is typically stored at media platform 5 but it may be retrieved from elsewhere, or indeed streamed as it is received at media platform 5, for example from first computer platform 3.

In response to this request, which may be accompanied by appropriate login, password, multifactor and/or biometric authentication, media platform 5 retrieves personal attribute information. The user attribute information may include at least one item of information selected from the following group: User name, IP address of the remote client system, user name, user ID, current time, and current date. This information may be supplied by the user of remote client system 7, 9 or 11, at each session, or may be stored by media platform 5 or may be retrieved by media platform 5 from elsewhere and may be partially or wholly included in a watermark. The watermark may also include additional information about the video such as the content owner, the name of the current project and the like.

Media platform 5 then generates a visible overlay watermark that is sent to remote client system 7, 9 or 11 containing user attribute information so that the user attribute information is clearly visible on the visual display of remote client system 7, 9 or 11. Media platform 5 transmits (streams) the video file from media platform 5 to remote client system 7, 9 or 11 where it is shown on the visual display at the same time as the visible overlay watermark. Typically, the video is streamed from the point selected by the user. Media platform 5 then selects a second point which is typically later in time in the video file than the first point selected by the user.

The video file is segmented into multiple segments. at media platform 5. Then media platform 5 executes a plurality of massively parallel processors to destructively burn-in at least one of a visible watermark or an invisible watermark to the video stream before it is sent to remote client system 7, 9 or 11.

If the remote client system 7, 9 or 11 does not pause or halt the playing of the video before the second point, at the second point the video stream transmitted to the remote client system 7, 9 or 11 has the watermark destructively burnt into it. Optionally, the overlay watermark may then be removed. Therefore, display of watermark information is provided without delay in a video stream caused by generation of embedded or burnt in watermarks. The second point is typically calculated by the estimated delay in time for embedded or burnt in watermarks to be generated by the massively parallel processors, so that the nondestructive watermark is used for the shortest amount of time that it takes to generate and transmit the destructively watermarked content to remote client system 7, 9 or 11. In an administrative graphical user interface to media platform 5, preferably accessible via a remote client system 7, 9 or 11, there is provided an option for a selected video file or group of files to disable the option of displaying the overlay watermark. If this option is selected, then sending the video to remote client system 7, 9 or 11 is delayed until the visible watermarking is embedded or burnt in.

Media platform 5 may store a copy of the destructively watermarked file. Media platform 5 may also destructively watermark the portion of the file between first and second points. This stored destructively watermarked file is then available for streaming from media platform 5 to remote client system 7, 9 or 11 Any subsequent streaming of a destructively watermarked file may not require an overlay if sent to the same remote client system that previously requested it, if authentication information matches previous streaming. However, additional visible or invisible watermarking may be added on subsequent streaming requests, for example timestamp information.

It is possible to pre-emptively burn in at least part of the visible watermark before the request is made to view a video. For example, at media platform 5, generating a burnt-in or embedded watermark in at least part of the video stream can be done before receiving from a remote client system an indication to play a video from a first point in a video stream; Where the part is selected on the basis of a priority score generated by previous user selection of streaming points in previous video viewings. The priority score is typically generated by: How often a particular temporal region of a video stream was previously selected for streaming. Therefore, highly popular sections of video are prioritized for watermark burn in. Furthermore, sections that have been tagged as high-priority, e.g. by on-set video assist or other system tagging them as "ACTION" by accepting user input or other sensor data may be prioritized for watermark burn-in.

Alternatively, the part to be prioritized can be selected on the basis of whether it is between a start record time metatag and an end record time metatag associated with the video streaming content. So only video content that may be useful for the final product need be prioritized for watermark burn-in or embedding.

Alternatively, the part to be prioritized can be selected on the basis of whether it is between a start metatag and an end metatag associated with the video streaming content where the start metatag and an end metatag are generated by user input received at at least one of first computer platform 3, or first media viewing platform 7 or editing platform 9 or second media viewing platform 11. Therefore only video content that may be useful for the final product need be prioritized for watermark burn-in or embedding.

Alternatively, before a request is made to view a video file, at least a portion of the file may be pre-emptively watermarked in response to receipt of instructions at media platform 5 from remote client system 7, 9 or 11. The instructions received from remote client system 7, 9 or 11. are typically generated in response to user input via for example a graphical user interface. For example an identifier such as a user identifier associated with each remote client system 7, 9 or 11. may be available via a graphical user interface at one or more of remote client systems 7, 9 or 11. Upon receipt of user input at a graphical user interface at remote client system 7, 9 or 11, user identifiers may be associated with metadata associated with video files.

For example, at a graphical user interface at a remote client system 7, 9 or 11 a user may enter instructions to specify a group of other users associated with a project. A user may also enter instructions to create metadata relating multiple video files in a group, such as a playlist. The playlist may be associated with a group of users or an individual user. The instructions received at the remote client system 7, 9 or 11 are then transmitted to media platform 5 via the communications links provided. Upon receipt of the instructions at media platform 5, media platform 5 identifies all user information associated with a video file or group of video files. Media platform 5 then creates a copy of the media file with destructively burnt in personalised watermark information corresponding to each user associated with each file. Subsequently, upon receipt of a request from a remote client system 7, 9 or 11 for a given video file, media platform 5 looks up user information associated with each client device. Media platform 5 then transmits to the remote client system the video file containing the destructively burnt in watermarking associated with the user information corresponding to the remote client system from which the request for the file was received at media platform 5. Overlay watermarks may not be necessary in this case.

Figure 6:
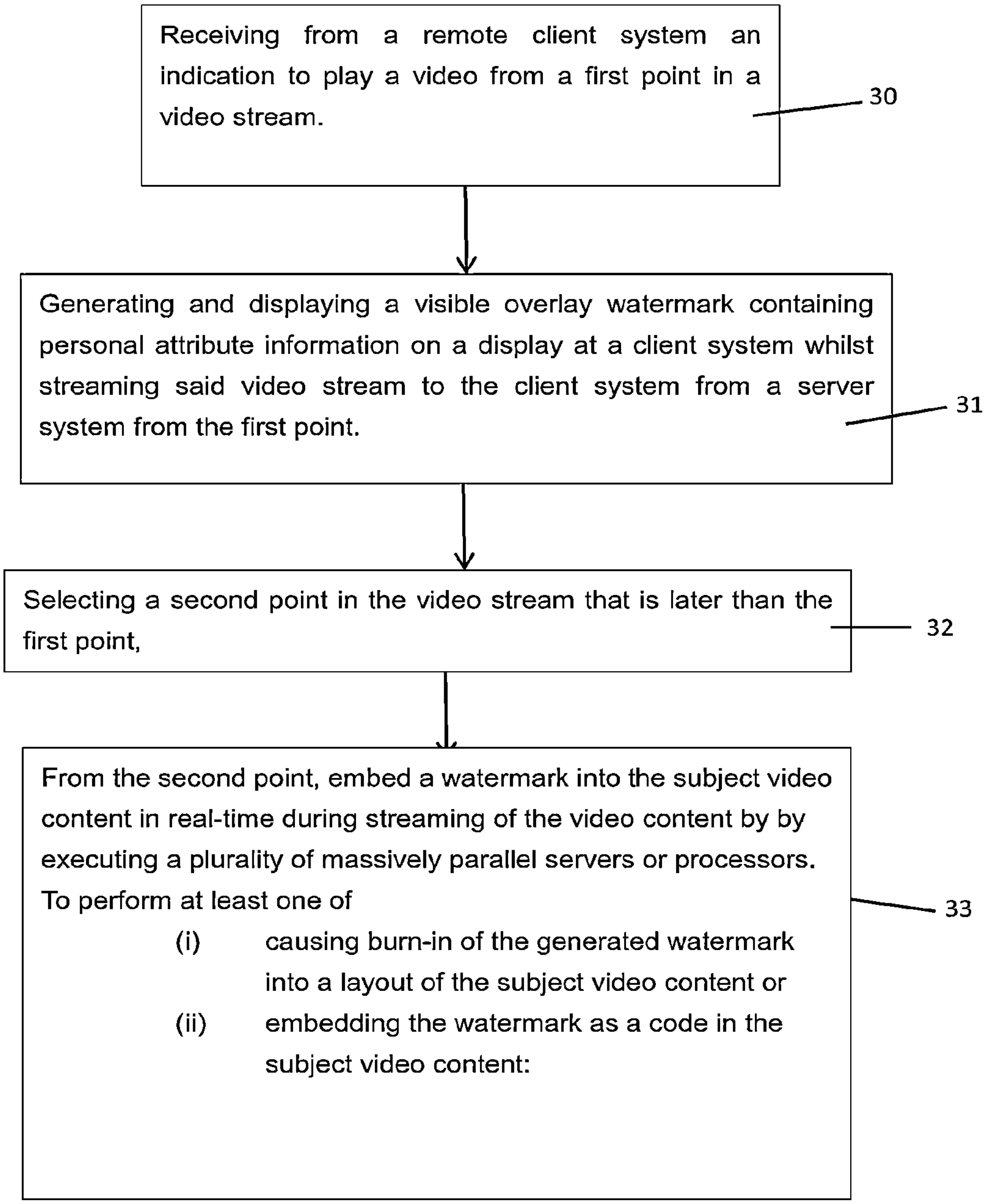
FIG. 6 is a diagram of an exemplary method according to a further embodiment.

This may be viewed with reference to FIG. 6 which shows a simplified diagram of an exemplary method.

FIG. 6 shows the following steps:

Receiving from a remote client system an indication to play a video from a first point in a video stream 30;

Generating and displaying a visible overlay watermark containing personal attribute information on a display at a client system whilst streaming the video stream to the client system from a server system from the first point 31;

Selecting a second point in the video stream that is later than the first point, 32;

From the second point, embed a watermark into the subject video content in real-time during streaming of the video content by executing a plurality of massively parallel servers or processors to perform at least one of:

(i) causing burn-in of the generated watermark into a layout of the subject video content or (ii) embedding the watermark as a code in the subject video content. 33.

Camera Proxy Transfer

Figure 7:
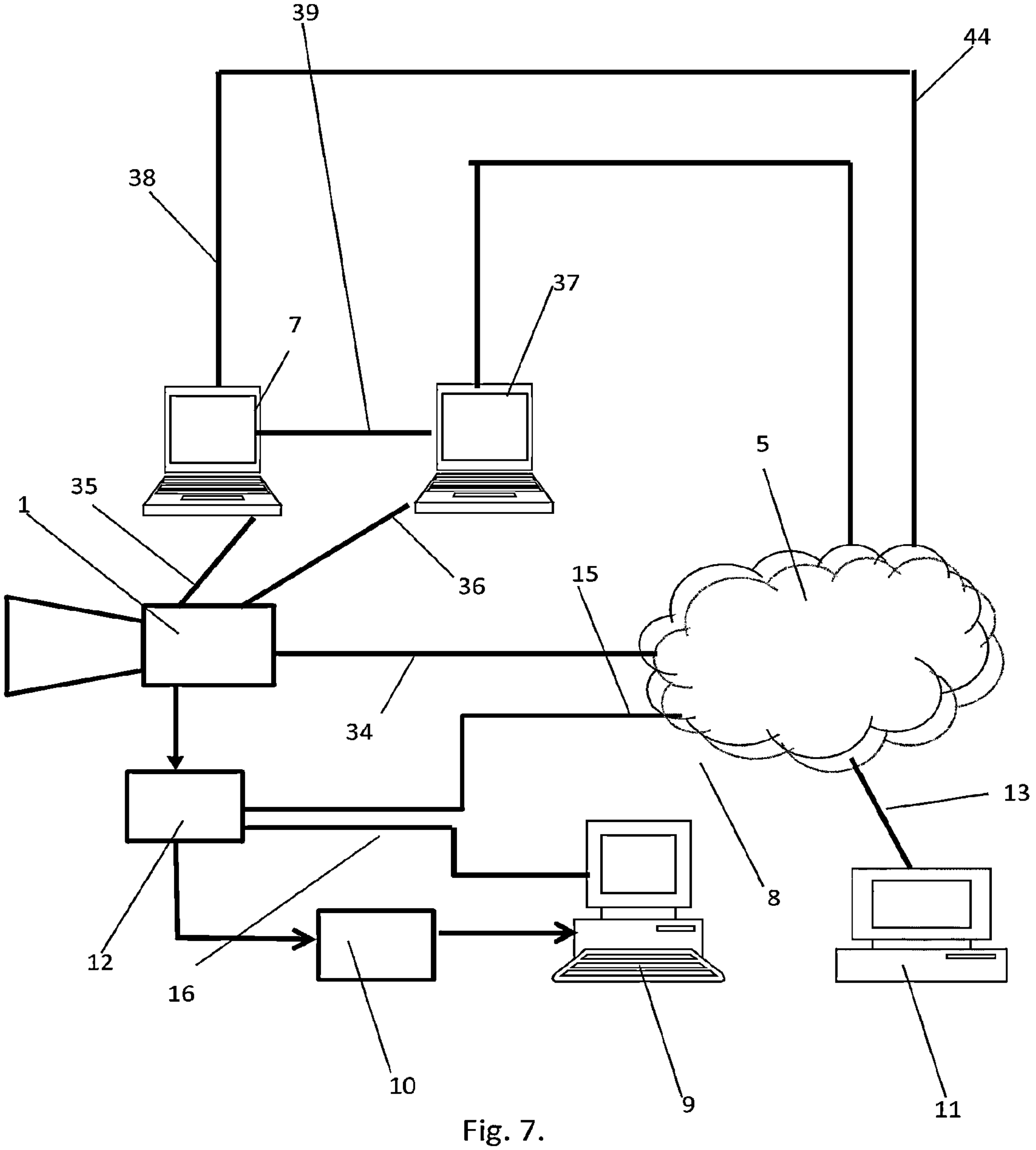
FIG. 7 is a block diagram of an exemplary system according to a still further embodiment.

In another aspect there is provided an improved camera and data transfer method from a camera. As previously described under "Prior art" currently there are cameras that record both first version files and their second version "proxy" equivalents onto camera cards for transfer to a data transfer station. Such cameras also may make streaming media available via, for example, a wired or wireless network. However, it would be useful to have the second version files immediately available to recipients for use in editing, reviewing and annotating etc. Refer now to FIG. 7, which shows a further exemplary embodiment.

Camera 1 records both first version and second version files to media. Both first version files and second version files may be transferred to data transfer station 12 using removable media.

A media stream may be transferred from Camera 1 over eighth communication link 34 to media platform 5 and over ninth communication link 35 to first media viewing platform 7 and tenth communication link 36 to third media viewing platform 37.

Media platform 5 may restream the media stream, to, for example, editing platform 9, second media viewing platform 11, and data transfer station 12.

Therefor the second media stream recipient group devices include for example, media platform 5, first media viewing platform 7, and third media viewing platform 37, editing platform 9, second media viewing platform 11, and data transfer station 12.

At least some of the second media stream recipient group devices such as for example one or more of eighth communication link 34 to media platform 5 and over ninth communication link 35 to first media viewing platform 7 and tenth communication link 36 to third media viewing platform 37,may be connected via a peer-to-peer network such as a peer-to-peer wireless network such as a wireless mesh network or ad hoc network. Therefore the stream may be retransmitted amongst the second media stream recipient group devices using edge caching at the second media stream recipient group devices. The media stream may be received at one or more of the second media stream recipient group devices and restreamed to any of the other second media stream recipient group devices with which there is a connection.

Metadata may be generated at any of the second media stream recipient group devices and associated with the media stream. Typically such metadata may be generated in real time. For example, comments may be added in real time by user input at second media stream recipient group devices.

Furthermore a user of a second media stream recipient group device may add metadata tags that are associated with timecode. These tags may include comments such as "action" and "cut" for example. Additional comments may be added and associated with portions of timecode, for example, portions of timecode between two timecode tags generated at a second media stream recipient group device.

Metadata indicating whether the media stream was being recorded at camera 1 is typically included in the media stream. Second media stream recipient group devices typically do not allow certain types of metadata to be entered in respect to portions of the media stream for which no equivalent file is being recorded at camera 1, for example comments linked to timecode. Alternatively, second media stream recipient group devices will provide a warning display if user input is entered against portions of the media stream for which no equivalent file is being recorded at camera 1, However metadata that does not require reference to timecode could be received at second media stream recipient group devices and associated with a media stream even if there is no equivalent media file being recorded at camera 1. This timecode-independent metadata could include comments, such as lens information, take, scene, filter, Select (print) takes. Script supervisor notes, camera information and other information typically included in camera sheets. A second media stream recipient group device may store such timecode independent metadata once entered and associate it with subsequent media streams so as to minimize the requirement for unnecessary user input. The user of a second media stream recipient group device need only update the previously entered timecode independent metadata when it is desired to change it with respect to subsequent media streams. Second media stream recipient group devices may generate media stream associated metadata without requiring user input. For example, for every media stream for which there is associated metadata indicating that the stream is being recorded at camera 1, the "take" filed metadata may be automatically incremented.

Metadata generated with reference to a media stream at a second media stream recipient group device may be stored at the second media stream recipient group device. It may also be made available in real-time using the communications links to other second media stream recipient group devices.

Furthermore, metadata generated with reference to a media stream at a second media stream recipient group device may be transmitted back to camera 1. The metadata generated with reference to a media stream at a second media stream recipient group device may then be linked to one or more of first version media files and second version media files which were recorded at camera 1 substantially simultaneously with the media stream, Typically, metadata added against media stream time code will be linked to the equivalent timecode in the media file.

Timecode-independent metadata will typically be added to the media file associated with a given media stream. Second version media files on camera to which the metadata generated from the live stream has been linked may then be transmitted to other computing devices such the second media stream recipient group devices along with metadata generated from the live stream.

Alternatively, metadata generated with reference to a media stream at a second media stream recipient group device may be linked to one or more of first version media files and second version media files at one computing device that receives one or more of first version media files and second version media files, in particular at media platform 5 or data transfer station 12. Typically, second media stream recipient group devices will transit their metadata generated with reference to a media stream to one device such as media platform 5 or data transfer station 12. The computing device at which the linking of the metadata generated with reference to a media stream to a media file may or may not also be a second media stream recipient group device.

Second version "proxy" files and associated metadata may be transferred from camera 1 over eighth communication link 34 to media platform 5 and over ninth communication link 35 to first media viewing platform 7 and tenth communication link 36 to third media viewing platform 37. Metadata related to the second version files contains data identifying the equivalent first version file associated with each second version file.

Transfer of second version "proxy" files and associated metadata may be scheduled to occur under a number of trigger conditions. For example, it may occur upon camera 1 receiving a request from one or more of media platform 5 over eighth communication link 34 or first media viewing platform 7 over ninth communication link 35 or third media viewing platform 37 over tenth communication link 36. Note that a request from media platform 5 may be relayed from for example first media viewing platform 7 or third media viewing platform 37 or editing platform 9 or second media viewing platform 11. Alternatively, transfer may be initiated as soon as a segment of a second version "proxy" files has been generated at camera 1. Transfer may be initiated by the generation at camera 1 of a "Stop recording" metadata datum associated with either first version or second version files.

Alternatively, second media stream recipient group devices may cache the media stream previously transmitted. Camera 1 may send metadata generated with the media stream previously transmitted, in particular "start recording" and "stop recording" timecode markers. The second media stream recipient group devices may then truncate the cached media stream as described previously to generate a local version of a second version media file. This may reduce or eliminate the need for a subsequent retransmission of a second version media file from camera 1.

Camera 1 may embed a visible or invisible watermark into second version files before transmission. The watermark may include information identifying a device and/or a user of a device that requests a second version file. This may include personalized watermarking as described previously. Alternatively, upon receiving a request for a second version file from one or more of 7 or third media viewing platform 37 or editing platform 9 or second media viewing platform 11, camera 1 may transfer second version file to media platform 5 for processing such as transcoding, watermark embedding, colour grading, processing of data or metadata and the like before transfer from media platform 5 to the device that sent the request. Requests from one or more of 7 or third media viewing platform 37 or editing platform 9 or second media viewing platform 11 may be sent directly to camera 1 or sent via media platform 5 or sent to both media platform 1 and camera 1.

Streaming of media from camera 1 may be suspended while second version files are transmitted from camera 1 or may may be dispensed with altogether.

Second version files need not necessarily be recorded at camera 1 at all but may be sent directly to a recipient device over eighth communication link 34 or ninth communication link 35 or tenth communication link 36.

Second version file transfer and metadata transfer identifying first version files from the camera may be performed:

(1) simultaneously with streaming media over the communication links (2) simultaneously with camera recording of other files.

(3) simultaneously with camera transcoding of other files from first version to second version.

Multiple second version files may be transferred simultaneously.

Furthermore, a second version file may be transferred in segments before it has finished recording, with metadata concerning its end recording timecode being transferred over the communication links after recording has ceased. In this case, metadata may be added at second media stream recipient group devices with respect to the second version file as described previously in relation to a media stream from camera 1.

Because it may be desirable to have second version files available to multiple recipients as rapidly as possible after they become available, there may be provided amongst the recipients such as media platform 5,first media viewing platform 7 and third media viewing platform 37 a peer-to-peer network such as a peer-to-peer wireless network such as a wireless mesh network or ad hoc network having various recipient nodes where at least one of the nodes such as media platform 5 is a massively parallel "cloud" computer system. Media platform 5 may include multiple processors and feature load balancing amongst the processors. Load balancing divides traffic between network interfaces on a network socket (OSI model layer 4) basis, Media platform 5 may include autoscaling. Autoscaling, is a method used in cloud computing, whereby the amount of computational resources in a server farm, typically measured in terms of the number of active servers, scales automatically based on the load on the farm.

First media viewing platform 7 communicates with media platform 5 via eleventh communication link 38 and third media viewing platform 37 communicates with media platform 5 via twelfth communication link 44.

First media viewing platform 7 and third media viewing platform 37 communicate via thirteenth communication link 39.

It is to be noted that it may be possible to also send first version files across such a network to, for example, such as media platform 5, first media viewing platform 7 and third media viewing platform 37 removing the need for data transfer station 12. In this case all the functionality of data transfer station 12 described in previous embodiments would be transferred to camera 1. Even if bandwidth limitations limit the amount of first version file data that may be transferred via networks directly from the camera, limited data transfer may be desirable, for example for VFX pulls.

File Transfer

Figure 8:
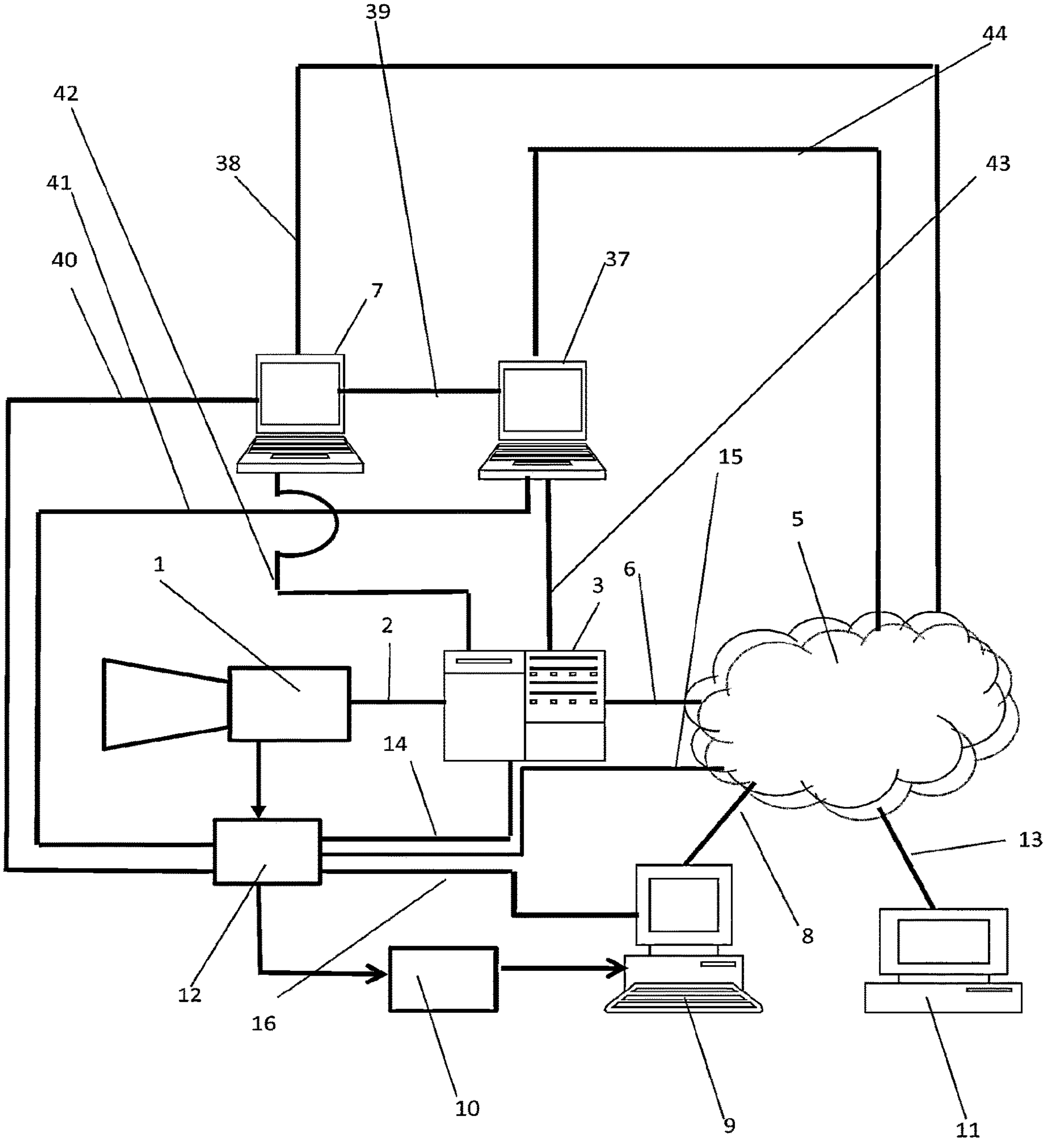
FIG. 8 is a block diagram of an exemplary system according to a yet further embodiment.

Refer now to FIG. 8, which depicts a block diagram of an embodiment of an exemplary system.

A difficulty with previous systems is that network connectivity problems, especially when filming in remote locations, and network bandwidth limitations, may impair the ability of some system users, to access media files in a timely manner. In particular, it may be difficult for first media viewing platform 7 and third media viewing platform 37 to access media files from media platform 5 via eleventh communication link 38 and twelfth communication link 44 respectively.

Therefore, there is provided the ability for first media viewing platform 7 and third media viewing platform 37 to access media files that may be available from first data transfer station 12 and media platform 5 using a single sign on.

Media platform 5 contains a first database of user authentication data and data transfer station 12 contains a second database of user authentication data. When a network connection available between data transfer station 12 and media platform 5 first database of user authentication data and second database of user authentication data may optionally be linked so that changes made to one database are reflected in another database when a network connection is available.

Second database of user authentication data will typically include device identification data that may be used to identify first media viewing platform 7 and third media viewing platform 37. First media viewing platform 7 and third media viewing platform 37 may transfer an identifier to data transfer station 12 allowing the device access to files stored at data transfer station.

12 if users of First media viewing platform 7 and third media viewing platform 37 have logged into the devices by supplying user identifiers such as biometric data, user identification data such as an email address passwords or data obtained by 2 factor authentication such as a message received via email, text message or a messaging app. First media viewing platform 7 and third media viewing platform 37 may locally cache media files from data transfer station 12 and media platform 5. If a user of first media viewing platform 7 or third media viewing platform 37 are logged in, they may review, edit and comment on locally cached media files even if no network connection is available. Data or metadata generated may be uploaded to data transfer station 12 or media platform 5 when a network connection becomes available. First media viewing platform 7 or third media viewing platform 37 may receive and locally cache a media file from media platform 5 and transfer it to data transfer station 12. This is useful for example, if there is no active network connection between data transfer station 12 and media platform 5 but first media viewing platform 7 and third media viewing platform 37 may be easily moved to a location where a network connection is available.

Conversely, first media viewing platform 7 or third media viewing platform 37 may receive and locally cache a media file from data transfer station 12 and transfer it to media platform 5. Administrator user input at data transfer station 12 and media platform 5 may be used to create new users and allow users of devices such as first media viewing platform 7 or third media viewing platform 37 to access one or more of data transfer station 12 and media platform 5 after transmission of user authentication data to data transfer station 12 and media platform 5 and matching the data with that stored in first database of user authentication data or second database of user authentication data respectively.

User authentication data may include passwords, device identifiers, biometric identifiers and the like.

When a user of first media viewing platform 7 or third media viewing platform 37 is logged into media platform 5 it is desirable that they should be able to access media files available at data transfer station 12 without needing to log in again, even if a network connection to media platform 5 is unavailable.

When a user of first media viewing platform 7 or third media viewing platform 37 is logged into computer platform 3 it is desirable that they should be able to access media files available at media platform 5 without needing to log in again, even if a network connection to media platform 5 is was unavailable when they initially logged into data transfer station 12 but subsequently becomes available.

Furthermore, if a network request is made for a media file from first media viewing platform 7 or third media viewing platform 37 it is desirable that the media file be supplied to the first media viewing platform 7 or third media viewing platform 37 if available from connected network nodes that may have a copy of the file, in the event that, for example, first computer platform 3 does not have a copy of the file or it would be a slower option to obtain it from first computer platform 3.

Therefore. first media viewing platform 7 is connected to data transfer station 12 via fourteenth communication link 40.

Third media viewing platform 37 is connected to data transfer station 12 via fifteenth communication link 41

First media viewing platform 7 is connected to first computer platform 3 via sixteenth communication link 42

Third media viewing platform 37 is connected to first computer platform 3 via seventeenth communication link 43.

A local media viewing database is maintained at least one of first computer platform 3 or data transfer station 12. The database contains a list of which network participants selected from a network participant group including at least one of first computer platform 3, media platform 5, first media viewing platform 7, editing platform 9, data transfer station 12, and third media viewing platform 37 have accessed a given media file. This information is passed to media platform 5 and stored in an equivalent database at media platform 5. When network connectivity permits, the equivalent database at media platform 5 and local media viewing database will update each other's records.

Peer-to-peer connections may be used to transfer database updates amongst members of the network participant group. For example, database update data from media platform 5 may be sent to media viewing platform 7 or third media viewing platform 37 over communication links 38 or 44 and forwarded to first computer platform 3 or data transfer station 12 from media viewing platform 7 or third media viewing platform 37.

Database update data from first computer platform 3 or data transfer station 12 may be sent to media viewing platform 7 or third media viewing platform 37 via 40 fourteenth communication link 41 or fifteenth communication link and forwarded to media platform 5 from media viewing platform 7 or third media viewing platform 37 over communication links 38 or 44.

If an authenticated request is made from media viewing platform 7 or third media viewing platform 37 to either first computer platform 3 or data transfer station 12 for a media file, the local media viewing database is queried to determine if a member of the network participant group has a copy. If so, a network connection is established between the requester and a copy is transferred from the member having the file to the member requesting the file.

If multiple copies of a media file or parts of a media file are available, or if multiple requests are made within a short timeframe, a peer-to-peer "swarm" may be established between network participants to deliver copies to requesters. A peer-to-peer method such as bittorrent may be used.

If a network participant requests a media file which is not currently available via any current network connection, other members of the network participant group will join the swarm and forward a copy if any of the network participants subsequently establish a connection to a network participant having the requested file or part thereof.

Even if no request had been made, copies of media files that exist at members of the network participant group may be sent to other members of the network participant group. For example, any media file that has been transferred from first computer platform 3 or data transfer station 12 to media viewing platform 7 or third media viewing platform 37 may be automatically sent to media platform 5 from media viewing platform 7 or third media viewing platform 37 if and when a network connection becomes available.

Likewise, any media file that has been transferred from media platform 5 to media viewing platform 7 or third media viewing platform 37 may be automatically sent to from media viewing platform 7 or third media viewing platform 37 to first computer platform 3 or data transfer station 12 if and when a network connection becomes available.

This would allow first computer platform 3 or data transfer station 12 to cache local copies of media files, and allow copies on media viewing platform 7 or third media viewing platform 37 to be deleted, freeing memory on media viewing platform 7 or third media viewing platform 37. This would be particularly useful if media viewing platform 7 or third media viewing platform 37 are small, handheld computing devices with limited memory.

In the aforementioned description of transfer of media files over communication links, adaptive bitrate techniques may be used. Multiple bitrate versions of media files may be stored at each network participant and the version sent may be selected by an algorithm that uses as inputs the measured data transfer rate over the network and time requirements. A higher quality file may be sent to replace a previously sent lower quality file if there is an increase in the measured data transfer rate over the network.

All steps described as taking place at media platform 5 could alternatively take place at first computer platform 3 and vice versa.

Alternatively media platform 5 and first computer platform 3 may be combined into one computer platform. In this instance, third communication link 6 could be omitted.

Alternatively data transfer station 12 and first computer platform 3 may be combined into one computer platform. In this instance, communication link 14 could be omitted.

Alternatively data transfer station 12 and first computer platform 3 and media platform 5 may be combined into one computer platform. In this instance, communication links 14 and 6 could be omitted.

Alternatively one or more of data transfer station 12 and first computer platform 3 and media platform 5 may be incorporated into camera 1.

It is to be noted that first computer platform 3 may be incorporated into camera or physically mounted on camera 1. Any of first computer platform 3, media platform 5, first media viewing platform 7, editing platform 9, data transfer station 12, and third media viewing platform 37 may include a non-transitory storage medium containing instructions for a computer that allows editing of files. The instructions may include, for example editing software such as Avid Media composer, from Avid, Inc.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject disclosure. Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of various embodiments. It is, of course, not possible to describe every conceivable combination of components or methodologies for purposes of describing the one or more aspects, but it is to be appreciated that many further combinations and permutations of the various aspects are possible. Accordingly, the subject disclosure is intended to embrace all such alterations, modifications, and variations. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosed illustrated exemplary aspects of the disclosed subject matter. In this regard, it will also be recognized that the aspects include a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art. Although the components described herein are primarily described in connection with performing respective acts or functionalities, it is to be understood that in a non-active state these components can be configured to perform such acts or functionalities.

In addition, while a particular feature may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component", "module", "system", "platform" or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific functions; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Reference throughout this specification to "one implementation," or "an implementation," or "one embodiment," or "an embodiment" means that a particular feature, structure, or characteristic described in connection with the implementation or embodiment is included in at least one implementation or one embodiment. Thus, the appearances of the phrase "in one implementation," or "in an implementation," or "in one embodiment," or "in an embodiment" in various places throughout this specification can, but are not necessarily, referring to the same implementation or embodiment, depending on the circumstances. Furthermore, the particular features, structures, or characteristics may be combined in any suitable manner in one or more implementations or embodiments.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, for example, via access requests, queries, or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, for example, a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In addition, while a particular feature of the disclosed aspects may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

While various embodiments of the system and method have been described above, it should be understood that they have been presented by way of example only, and not of limitation. Likewise, the various diagrams may depict an example architectural or other configuration for the system and method, which is done to aid in understanding the features and functionality that can be included in the system and method. The system and method is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the system and method. Also, a multitude of different constituent system names other than those depicted herein can be applied to the various partitions. Additionally, with regard to flow diagrams, operational descriptions and methods, the order in which the steps are presented herein shall not mandate that various embodiments be implemented to perform the recited functionality in the same order unless the context dictates otherwise.

Although the system and method is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the system and method, whether or not such embodiments are described and whether or not such features are presented as being a part of a described embodiment. Thus, the breadth and scope should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "system" does not imply that the components or functionality described or claimed as part of the system are all configured in a common package. Indeed, any or all of the various components of a system, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

All patents, patent applications, and published references cited herein are hereby incorporated by reference in their entirety. While the methods of the present disclosure have been described in connection with the specific embodiments thereof, it will be understood that it is capable of further modification. Furthermore, this application is intended to cover any variations, uses, or adaptations of the methods of the present disclosure, including such departures from the present disclosure as come within known or customary practice in the art to which the methods of the present disclosure pertain, and as fall within the scope of the appended claims. In various embodiments, hardwired circuitry can be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations that are not order dependent can be reordered and other operations can be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

LIST OF REFERENCE NUMERALS

1 Camera
2 First communication link
3 first computer platform
4 second communication link
5 media platform
6 third communication link
7 first media viewing platform
8 fourth communication link
9 editing platform
10 data-bearing medium
11. second media viewing platform
12 data transfer station
13. fifth communication link.
14 eighth communication link
15 sixth communication link
16 seventh communication link
17 Sending Metadata and video data from camera to first computer platform
18 At first computer platform, transcoding second version video into second version video files
19 Sending second version video files and metadata from first computer platform to cloud-based media platform
20 At cloud-based media platform, additional transcoding of second version video files
21 Transferring second version video files from cloud-based media platform to editing platform

22 Updating the metadata of second version video files with data relating to first version media files

23 Truncating the second version video files

24 receiving edited media from editing platform at cloud-based media platform

25 sending edited media from cloud-based media platform to first computer platform,

26 sending edited media from first computer platform, to first media viewing platform

27 receiving annotations relating to edited media from first media viewing platform at first computer platform

28 receiving annotations relating to edited media from first computer platform, at cloud-based media platform

29 sending annotations relating to edited media from cloud-based media platform, to editing platform

30 Receiving from a remote client system an indication to play a video from a first point in a video stream

31 Generating and displaying a visible overlay watermark containing personal attribute information on a display at a client system whilst streaming the video stream to the client system from a server system from the first point.

32 Selecting a second point in the video stream that is later than the first point,

33 From the second point, embed a watermark into the subject video content in real-time during streaming of the video content by executing a plurality of massively parallel servers or processors. to perform at least one of (i) causing burn-in of the generated watermark into a layout of the subject video content or (ii) embedding the watermark as a code in the subject video content.

34 eighth communication link

35 ninth communication link

36 tenth communication link

37 third media viewing platform

38 eleventh communication link

39 thirteenth communication link

40 fourteenth communication link

41 fifteenth communication link

42 sixteenth communication link

43 seventeenth communication link

44 twelfth communication link

What is claimed is:

1. A method of associating media files comprising:

(a) receiving at a user system, a second version file converted from a camera media stream wherein said second version file converted from a camera media stream has first metadata relating to a first version media file, and wherein the second version file has a different timecode or length than the first version media file, and wherein the second version file has footage for which there is no corresponding footage available in the first version media file;

(b) receiving at said user system, an additional second version file generated from said first version media file, wherein the additional second version file has a different timecode or length than the first version media file, and wherein said additional second version file has second metadata relating to the first version media file, and wherein the additional second version file has footage for which there is no corresponding footage available in the first version media file; and (c) at said user system:

(1) updating said first metadata with data from said second metadata, wherein the updated first metadata enables replacing said second version file with said additional second version file; and (2) replacing said second version file converted from a camera media stream with said additional second version file generated from said first version media file based on the updated first metadata and the second metadata, wherein the updated first metadata and the second metadata ensure that the second version file and the additional second version file can be matched to the first version media file.

2. The method of claim 1 wherein said additional second version file generated from said first version media file has a filename and wherein said filename matches metadata relating to said first version media file.

3. The method of claim 1 wherein said additional second version file generated from said first version media file is of higher resolution than said second version file converted from a camera media stream.

4. The method of claim 1 wherein said user system comprises an editing platform and wherein said step of replacing said second version file converted from a camera media stream with said additional second version file generated from said first version media file occurs after at least one editing decision has been made.

5. The method of claim 1 wherein said user system further comprises an editing device, wherein said editing device comprises one or more bins and wherein said user system, in response to the receipt of said second version file converted from a camera media stream, auto populates said bins in said editing device at said user system with metadata associated with said second version file converted from a camera media stream.

6. The method of claim 1 wherein said user system further comprises an editing device; wherein said editing device comprises one or more bins and wherein said user system, in response to the receipt of said additional second version file generated from said first version media file, auto populates said bins in said editing device at said user system with metadata associated with said additional second version file generated from said first version media file.

7. A method of associating media files comprising:

(a) receiving at a user system, a second version file generated by a camera wherein said second version file generated by a camera has first metadata relating to a first version media file also generated at said camera, and wherein the second version file has a different timecode or length than the first version media file, and wherein the second version file has footage for which there is not corresponding footage available in the first version media file;

(b) receiving at said user system, an additional second version file generated from said first version media file, wherein the additional second version file has a different timecode or length than the first version media file, and wherein said additional second version file has second metadata relating to the first version media file, and wherein the additional second version media file has footage for which there is no corresponding footage available in the first version media file; and (c) at said user system:

(1) updating said first metadata with data from said second metadata, wherein the updated metadata enables replacing said second version file with said additional second version file; and (2) replacing said second version file generated by a camera with said additional second version file generated from said first version media file based on the updated first metadata and the second metadata, wherein the updated first metadata and the second metadata ensure that the second version file and the additional second version file can be matched to the first version media file.

8. The method of claim 7 wherein said additional second version file generated from said first version media file has a filename and wherein said filename matches metadata relating to said first version media file.

9. The method of claim 7 wherein said additional second version file generated from said first version media file is of higher resolution than said second version file generated by a camera.

10. The method of claim 7 wherein said user system is a editing platform and wherein said step of replacing said second version file generated by a camera with said additional second version file generated from said first version media file occurs after at least one editing decision has been made.

11. The method of claim 7 wherein said user system further comprises an editing device, wherein said editing device comprises one or more bins and wherein said user system, in response to the receipt of said second version file generated by a camera, auto populates said bins in said editing device at said user system with metadata associated with said second version file generated by a camera.

12. The method of claim 7 wherein said user system further comprises an editing device, wherein said editing device comprises one or more bins and wherein said user system, in response to the receipt of said additional second version file generated from said first version media file, auto populates said bins in said editing device at said user system with metadata associated with said additional second version file generated from said first version media file.

13. A system for associating media files, comprising one or more computers programmed to implement the steps of:

(a) receiving at a user system, a second version file generated by a camera wherein said second version file generated by a camera has first metadata relating to a first version media file also generated at said camera, and wherein the second version file has a different timecode or length than the first version media file, and wherein the second version file has footage for which there is no corresponding footage available in the first version media file;

(b) receiving, at said user system, an additional second version file generated from said first version media file, wherein the additional second version file has a different timecode or length than the first version media file, and wherein said additional second version file has second metadata relating to the first version media file, and wherein the additional second version file has footage for which there is no corresponding footage available in the first version media file; and (c) at said user system:

(1) updating said first metadata with data from said second metadata, wherein the updated metadata enables replacing said second version file with said additional second version file; and (2) replacing said second version file generated by a camera with said additional second version file generated from said first version media file based on the updated first metadata and the second metadata, wherein the updated first metadata and the second metadata ensure that the second version file and the additional second version file can be matched to the first version media file.

14. The system of claim 13 wherein said additional second version file generated from said first version media file has a filename; and wherein said filename matches metadata relating to said first version media file.

15. The system of claim 13 wherein said additional second version file generated from said first version media file is of higher resolution than said second version file generated by a camera.

16. The system of claim 13 wherein said user system is an editing platform and wherein said one or more computers programmed to implement said step of replacing said second version file generated by a camera with said additional second version file generated from said first version media file are programmed to implement said step after at least one editing decision has been made.

17. The system of claim 13 wherein said user system further comprises an editing device, wherein said editing device comprises one or more bins and wherein said user system, in response to the receipt of said second version file generated by a camera, is programmed to auto populate said bins in said editing device at said user system with metadata associated with said second version file generated by a camera.

18. The system of claim 13 wherein said user system further comprises an editing device, wherein said editing device comprises one or more bins and wherein said user system, in response to the receipt of said additional second version file generated from said first version media file, is programmed to auto populate said bins in said editing device at said user system with metadata associated with said additional second version file generated from said first version media file.

* * * * *